(12) United States Patent
Farmer et al.

(10) Patent No.: US 11,223,951 B1
(45) Date of Patent: *Jan. 11, 2022

(54) APPLICATION-LEVEL WIRELESS SECURITY FOR WEARABLE DEVICES

(71) Applicant: Verily Life Sciences LLC, Mountain View, CA (US)

(72) Inventors: Shane Alexander Farmer, San Francisco, CA (US); Robert Lieh-Yuan Tsai, San Francisco, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,310

(22) Filed: Feb. 8, 2017

Related U.S. Application Data

(63) Continuation of application No. 14/306,192, filed on Jun. 16, 2014, now Pat. No. 9,600,676.

(51) Int. Cl.
| | | |
|---|---|---|
| *H04L 9/00* | (2006.01) | |
| *H04W 12/08* | (2021.01) | |
| *H04L 9/32* | (2006.01) | |
| *H04W 12/06* | (2021.01) | |
| *G06F 1/16* | (2006.01) | |
| *G06F 21/62* | (2013.01) | |
| (Continued) | | |

(52) U.S. Cl.
CPC ............ *H04W 12/08* (2013.01); *G06F 1/163* (2013.01); *G06F 21/6245* (2013.01); *H04L 9/3247* (2013.01); *H04L 9/3271* (2013.01); *H04L 63/0442* (2013.01); *H04W 12/06* (2013.01); *H04B 1/385* (2013.01); *H04L 2209/80* (2013.01)

(58) Field of Classification Search
CPC .................................................. H04W 12/08
USPC ........................................................ 713/176
See application file for complete search history.

(56) References Cited

U.S. PATENT DOCUMENTS

| | | | |
|---|---|---|---|
| 6,968,453 B2 | 11/2005 | Doyle et al. | |
| 8,653,965 B1* | 2/2014 | Otto ................... | G08B 21/0453 340/286.01 |
| 9,600,676 B1 | 3/2017 | Farmer et al. | |
| (Continued) | | | |

FOREIGN PATENT DOCUMENTS

EP            1916632 A1        4/2008

*Primary Examiner* — Christopher J Brown
(74) *Attorney, Agent, or Firm* — Kilpatrick Townsend & Stockton LLP

(57) ABSTRACT

Methods and devices for communicating sensitive data to applications are provided. A wearable device can wirelessly connect with a second computing device. The wearable device can be configured to obtain sensitive data. The second computing device can provide a first software application and a second software application. The wearable device can wirelessly receive a first request for the sensitive data from the first application. The wearable device can send a response denying the first request to the first application. The wearable device can wirelessly receive a second request for the sensitive data from the second application. The wearable device can determine whether the second request is authenticated to be associated with the second application. After determining that the second request is authenticated to be associated with the second application, the wearable device can wirelessly send the sensitive data to the second application.

17 Claims, 16 Drawing Sheets

(51) Int. Cl.
*H04L 29/06* (2006.01)
*H04B 1/3827* (2015.01)

(56) References Cited

U.S. PATENT DOCUMENTS

| | | | |
|---|---|---|---|
| 2002/0068604 A1 | 6/2002 | Prabhakar et al. | |
| 2003/0097561 A1* | 5/2003 | Wheeler | G06Q 20/02 713/168 |
| 2003/0229781 A1* | 12/2003 | Fox | H04L 12/18 713/155 |
| 2004/0139349 A1 | 7/2004 | Henn et al. | |
| 2010/0315225 A1* | 12/2010 | Teague | A61B 5/0024 340/539.12 |
| 2013/0159705 A1 | 6/2013 | Leedom, Jr. | |
| 2014/0201814 A1* | 7/2014 | Barkie | H04L 63/107 726/4 |
| 2014/0343371 A1* | 11/2014 | Sowers, II | A61B 5/1455 600/301 |
| 2015/0134358 A1* | 5/2015 | Fisher | G06F 19/323 705/3 |
| 2015/0135258 A1 | 5/2015 | Smith et al. | |
| 2015/0229625 A1* | 8/2015 | Grigg | H04L 63/08 726/6 |

* cited by examiner

APPLICATION-LEVEL WIRELESS SECURITY FOR WEARABLE DEVICES

CROSS-REFERENCE TO RELATED APPLICATION

This application is a continuation of application Ser. No. 14/306,192, filed Jun. 16, 2014, which is incorporated herein by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, and countless types of Internet-capable devices are prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." For example, some wearable devices are wearable computing devices are wrist-mounted devices that can worn like a wrist watch.

When a wearable computing device communicates wirelessly, such as with a smartphone or other computing device, typically device-level communications security is utilized. That is, once a secure wireless communication link is established between the wearable computing device and another device, any application on either device can utilize the secure wireless communication link.

SUMMARY

In one aspect, a method is provided. A wireless connection is established between a wearable computing device and a second computing device. The wearable computing device is configured to obtain sensitive data. The second computing device is configured to provide at least a first software application and a second software application. The wearable computing device receives a first request for a first portion of the sensitive data from the first application via the wireless connection. The wearable computing device sends a response denying the first request to the first application. The wearable computing device receives a second request for a second portion of the sensitive data from the second application via the wireless connection. The wearable computing device determines whether the second request is authenticated as associated with the second application. After determining that the second request is authenticated as associated with the second application, the wearable computing device sends the second portion of the sensitive data to the second application.

In another aspect, a wearable computing device is provided. The wearable computing device includes a wireless communication interface, a processor, and a non-transitory computer readable medium. The non-transitory computer readable medium is configured to store at least sensitive data and executable instructions. The executable instructions, when executed by the processor, cause the wearable computing device to perform functions including: establishing a wireless connection with a second computing device using the wireless communication interface, where the second computing device is configured to provide at least a first software application and a second software application; receiving a first request for a first portion of the sensitive data from the first application via the wireless connection; sending a response denying the first request to the first application via the wireless connection; receiving a second request for a second portion of the sensitive data from the second application via the wireless connection; determining whether the second request is authenticated as associated with the second application; and after determining that the second request is authenticated as associated with the second application, sending the second portion of the sensitive data to the second application.

In another aspect, a non-transitory computer readable medium is provided. The non-transitory computer readable medium is configured to store at least executable instructions. The executable instructions, when executed by a processor of a wearable computing device, cause the wearable computing device to perform functions including: establishing a wireless connection between the wearable computing device and a second computing device, where the second computing device is configured to provide at least a first software application and a second software application; receiving a first request for a first portion of sensitive data from the first application via the wireless connection; sending a response denying the first request to the first application via the wireless connection; receiving a second request for a second portion of the sensitive data from the second application via the wireless connection; determining whether the second request is authenticated as associated with the second application; and after determining that the second request is authenticated as associated with the second application, sending the second portion of the sensitive data to the second application.

In another aspect, a wearable computing device is provided. The wearable computing device comprises: means for establishing a wireless connection with a second computing device, where the second computing device is configured to provide at least a first software application and a second software application; means for obtaining sensitive data; means for receiving a first request for a first portion of the sensitive data from the first application via the wireless connection; means for sending a response denying the first request to the first application; means for receiving a second request for a second portion of the sensitive data from the second application via the wireless connection; means for determining whether the second request is authenticated as associated with the second application; and means for, after determining that the second request is authenticated as associated with the second application, sending the second portion of the sensitive data to the second application.

DETAILED DESCRIPTION

Application-Level Wireless Security for Wearable Devices

Figure 1:
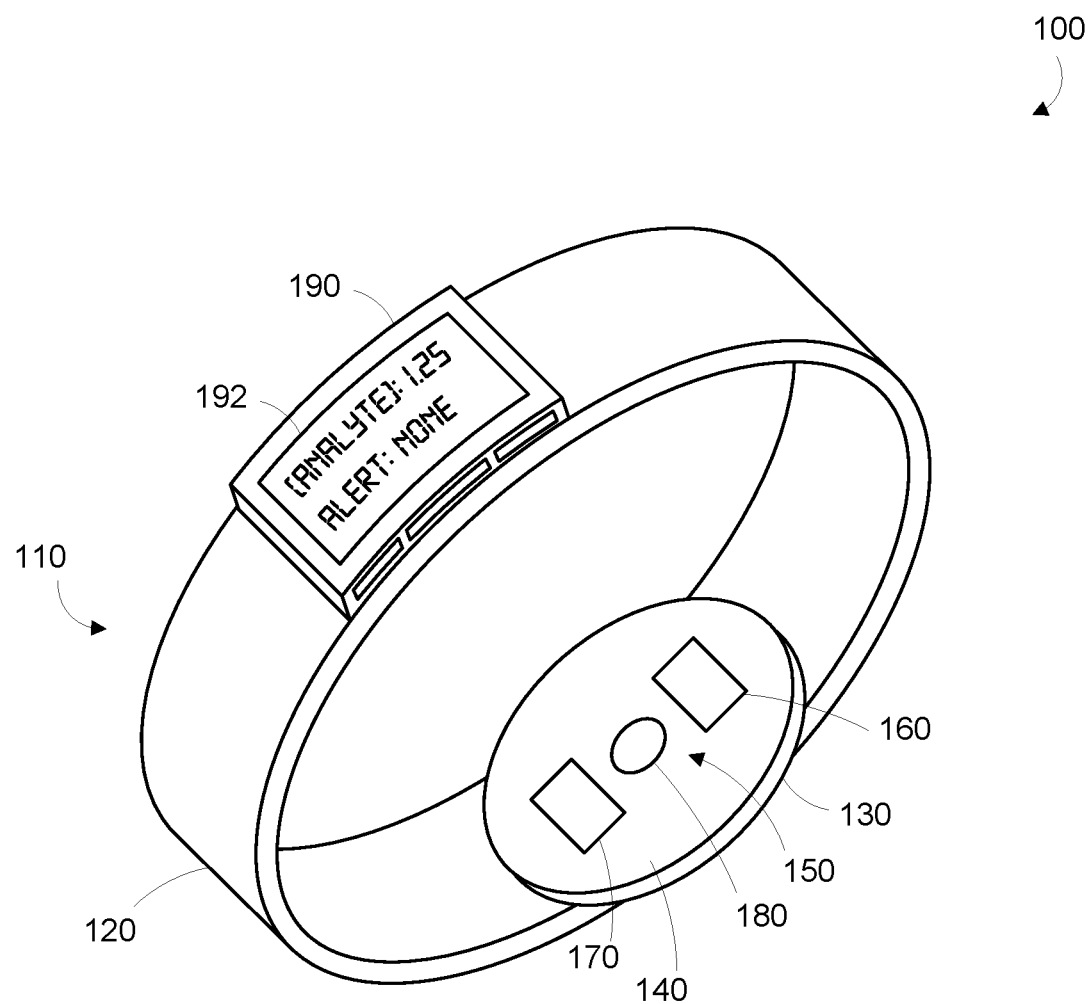
FIG. 1 is a perspective view of an example wearable device.

An example wearable device is a wearable computing device that automatically detects, measures, and possibly stores data about a wearer wearing a device, where the data can include physiological and environmental parameters. The physiological parameters could include any parameters that may relate to the health of the wearer and the environmental parameters may relate to an environment about the wearer. To measure the physiological parameters, the wearable device can include sensors for measuring blood pressure, pulse rate, skin temperature, and/or one or more analytes in blood circulating in subsurface vasculature proximate to the wearable device. For example, the one or more analytes can include enzymes, hormones, proteins, cells or other molecules. In some cases, the wearable device can include sensors to measure environmental parameters related to the wearer, such as location, temperature, humidity, wind speed/direction, time of day, and illumination parameters.

The wearable device can include a mount that is configured to mount the device to a specific surface of the person's body, more particularly, to a body location where subsurface vasculature is readily observable. For example, the wearable device can include a wristband for mounting the wearable device on the wrist. In this position, the wearable device may be only about 2-4 millimeters away from the midpoint of an artery, capillary or vein in the wrist. In other cases, the wearable device can be mounted on/near other body locations.

The wearable device can further include memory for storing data, such as but not limited to the physiological parameters and/or results of the data analysis, and a communication interface for transmitting at least stored data to medical personnel and/or receiving instructions or recommendations based on a medical personnel or remote computing device's interpretation of those results. In some examples, the communication interface is a wireless communication interface. The communication interface may also include a universal serial bus (USB) interface, a secure digital (SD) card interface, a wired interface, or any other appropriate interface for communicating data from the device to a server. The term "server" may include any system or device that responds to requests across a computer network to provide, or helps to provide, a network service, and may include servers run on dedicated computers, mobile devices, and those operated in a cloud computing network.

Some or all of the data sharable by the wearable device can be considered as sensitive data to the wearer. Sensitive data can be data including, but not limited to, the above-mentioned physiological parameters, location data, device status data, electronic messages, and/or wearer-generated data (e.g., notes, voice recordings, documents). Non-sensitive data can be any data not designated as sensitive data. In some embodiments, data stored on a wearable device can be designated as sensitive or non-sensitive data by the wearer or other entity. In other embodiments, data can be determined to be sensitive or non-sensitive based on context; e.g., a network address may be non-sensitive data during a communications session but may be sensitive data at other times. Many other examples of sensitive and non-sensitive data are possible as well.

Sensitive data, and perhaps non-sensitive data, can be communicated using secure communication links to other devices, such as associated computing devices and servers. Example associated computing devices include but are not limited to, smart phones, laptop computers, desktop computers, and tablet computers. The associated computing devices can provide functionality that may be difficult or impossible for the wearable devices; e.g., additional computing power, storage, communications interfaces, and/or user interfaces.

In some contexts, finer grained security for wearable-device data can be utilized. For example, if the wearable device generates and/or stores sensitive data, the wearer of the wearable device may not want to share the sensitive data with every possible application on an associated computing device. Instead, it may be desirable to allow sensitive data access to only a specified application or applications. Other, non-sensitive data may be more broadly available.

To provide application-level security between an application on an associated computing device and a wearable device, one or more secrets can be shared between the associated computing device application and the wearable device. For example, as an initialization technique, the associated computing device application can generate or otherwise determine a private-public key pair and provide the public key to the wearable device.

In operation, the associated computing device application can provide a request or other communication to the wearable device with a digital signature generated using the private key. The wearable device can authenticate the digital signature using the public key provided during initialization. If the digital signature is authentic, that is, the application actually signed the request or other communication, the wearable device can respond to the request or other communication. However, if the digital signature is not authentic, the wearable device can ignore the request and perhaps indicate reception of an invalid (and possibly malicious) communication.

In some embodiments, the wearable device can enable multiple associated computing device applications to communicate with the device; e.g., a wearable device can communicate with multiple associated computing device applications, wearable devices, associated computing devices, and/or other computing devices. In those embodiments, the wearable device can store multiple public keys for communicating with multiple entities. In other embodiments, the wearable device can provide additional application level security by encrypting data provided to the application using the application's public key. Then, only the application can decrypt the data using the private key.

By providing finer-grained application-level encryption for the wearable device, a wider variety of applications can utilize the wearable device. For example, the wearable device can communicate with high-security applications via secured communication links and application-level encryption, with medium-security applications using secured and/or unsecured communications links and perhaps application-level encryption, and to communicate with low-security applications using unsecured communications links and without necessarily using application-level encryption. In some cases, the wearable device can communicate with high-security, medium-security, and low-security applications simultaneously. Then, the wearable device can communicate data based on the security of the application; e.g., physiological and/or location data may be communicated only to high-security applications, while power-on/power-off information may be communicated to high, medium, and/or low-security applications. Many other examples are possible as well.

Example Wearable Devices

A wearable device 100 can automatically measure a plurality of physiological parameters of a person wearing the device. The term "wearable device," as used in this disclosure, refers to any device that is capable of being worn at, on or in proximity to a body surface, such as a wrist, ankle, waist, chest, or other body part. In order to take in vivo measurements in a non-invasive manner from outside of the body, the wearable device may be positioned on a portion of the body where subsurface vasculature is easily observable, the qualification of which will depend on the type of detection system used. The device may be placed in close proximity to the skin or tissue, but need not be touching or in intimate contact therewith. A mount 110, such as a belt, wristband, ankle band, etc. can be provided to mount the device at, on or in proximity to the body surface. The mount 110 may prevent the wearable device from moving relative to the body to reduce measurement error and noise. In one example, shown in FIG. 1, the mount 110, may take the form of a strap or band 120 that can be worn around a part of the body. Further, the mount 110 may be an adhesive substrate for adhering the wearable device 100 to the body of a wearer.

A measurement platform 130 is disposed on the mount 110 such that it can be positioned on the body where subsurface vasculature is easily observable. An inner face 140 of the measurement platform is intended to be mounted facing to the body surface. The measurement platform 130 may house the data collection system 150, which may include at least one detector 160 for detecting at least one physiological parameter, which could include any parameters that may relate to the health of the person wearing the wearable device. For example, the detector 160 could be configured to measure blood pressure, pulse rate, respiration rate, skin temperature, etc. At least one of the detectors 160 is configured to non-invasively measure one or more analytes in blood circulating in subsurface vasculature proximate to the wearable device. In a non-exhaustive list, detector 160 may include any one of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor. The components of the data collection system 150 may be miniaturized so that the wearable device may be worn on the body without significantly interfering with the wearer's usual activities.

In an example embodiment, the wearable device obtains at least some of the health-related information by detecting the binding of a clinically-relevant analyte to functionalized particles, for example, microparticles or nanoparticles introduced into a lumen of the subsurface vasculature. The term "binding" is understood in its broadest sense to also include a detectable interaction between the clinically relevant analyte and the functionalized particles. The particles can have a diameter that is less than about 20 micrometers. In some embodiments, the particles have a diameter on the order of about 10 nm to 1 μm. In further embodiments, small particles on the order of 10-100 nm in diameter may be assembled to form a larger "clusters" or "assemblies on the order of 1-10 micrometers. Those of skill in the art will understand a "particle" in its broadest sense and that it may take the form of any fabricated material, a molecule, cryptophane, a virus, a phage, etc. Further, a particle may be of any shape, for example, spheres, rods, non-symmetrical shapes, etc.

In some examples, the particles may be magnetic and can be formed from a paramagnetic, super-paramagnetic or ferromagnetic material or any other material that responds to a magnetic field. Alternatively, the particles may also be made of non-magnetic materials such as polystyrene.

The particles, or a group of several particles in a complex, may be functionalized with a receptor that has a specific affinity to bind to or interact with a clinically relevant analyte. The receptor may be inherent to the particle itself. For example, the particle itself may be a virus or a phage with an inherent affinity for certain analytes. Additionally or alternatively, the particles can be functionalized by covalently attaching a receptor that specifically binds or otherwise recognizes a particular clinically-relevant analyte. The functionalized receptor can be an antibody, peptide, nucleic acid, phage, bacteria, virus, or any other molecule with a defined affinity for a target analyte. Other compounds or molecules, such as fluorophores or autofluorescent or luminescent markers, which may assist in interrogating the particles in vivo, may also be attached to the particles.

The functionalized particles can be introduced into the person's blood stream by injection, ingestion, inhalation, transdermally, or in some other manner. Where magnetic particles are used, the wearable device may include a magnet that can direct into the portion of subsurface vasculature a magnetic field that is sufficient to cause the functionalized magnetic particles to collect in a lumen of that portion of subsurface vasculature. However, measurements may be taken without localized "collection" of the functionalized particles. The wearable device may be configured to activate the magnetic periodically, such as at certain times of every day (e.g., every hour).

In some examples, the data collection system 150 further includes a signal source 170 for transmitting an interrogating signal that can penetrate the wearer's skin into the portion of subsurface vasculature, for example, into a lumen of the subsurface vasculature. The interrogating signal can be any kind of signal that is benign to the wearer, such as electromagnetic, magnetic, optic, acoustic, thermal, mechanical, and results in a response signal that can be used to measure a physiological parameter or, more particularly, that can detect the binding of the clinically-relevant analyte to the functionalized particles. In one example, the interrogating signal is an electromagnetic pulse (e.g., a radio frequency (RF) pulse) and the response signal is a magnetic resonance signal, such as nuclear magnetic resonance (NMR). In another example, the interrogating signal is a time-varying magnetic field, and the response signal is an externally-detectable physical motion due to the time-varying magnetic field. The time-varying magnetic field modulates the particles by physical motion in a manner different from the background, making them easier to detect. In a further example, the interrogating signal is an electromagnetic radiation signal. In particular, the interrogating signal may be electromagnetic radiation having a wavelength between about 400 nanometers and about 1600 nanometers. The interrogating signal may, more particularly, comprise electromagnetic radiation having a wavelength between about 500 nanometers and about 1000 nanometers. In some examples, the functionalized particles include a fluorophore. The interrogating signal may therefore be an electromagnetic radiation signal with a wavelength that can excite the fluorophore and penetrate the skin or other tissue and subsurface vasculature (e.g., a wavelength in the range of about 500 to about 1000 nanometers), and the response signal is fluorescence radiation from the fluorophore that can penetrate the subsurface vasculature and tissue to reach the detector.

In some cases, an interrogating signal is not necessary to measure one or more of the physiological parameters and, therefore, the wearable device 100 may not include a signal source 170. For example, the functionalized particles include an autofluorescent or luminescent marker, such as a fluorophore, that will automatically emit a response signal indicative of the binding of the clinically-relevant analyte to the functionalized particles, without the need for an interrogating signal or other external stimulus. In some examples, the functionalized particles may include a chemoluminescent marker configured to produce a response signal in the form of fluorescence radiation produced in response to a chemical reaction initiated, at least in part, to the binding of the target analyte to the particle.

A collection magnet 180 may also be included in the data collection system 150. In such embodiments, the functionalized particles may also be made of or be functionalized with magnetic materials, such as ferromagnetic, paramagnetic, super-paramagnetic, or any other material that responds to a magnetic field. The collection magnet 180 is configured to direct a magnetic field into the portion of subsurface vasculature that is sufficient to cause functionalized magnetic particles to collect in a lumen of that portion of subsurface vasculature. The magnet may be an electromagnet that may be turned on during measurement periods and turned off when a measurement period is complete so as to allow the magnetic particles to disperse through the vasculature.

The wearable device 100 may also include a user interface 190 via which the wearer of the device may receive one or more recommendations or alerts generated either from a remote server or other remote computing device, or from a processor within the device. The alerts could be any indication that can be noticed by the person wearing the wearable device. For example, the alert could include a visual component (e.g., textual or graphical information on a display), an auditory component (e.g., an alarm sound), and/or tactile component (e.g., a vibration). Further, the user interface 190 may include a display 192 where a visual indication of the alert or recommendation may be displayed. The display 192 may further be configured to provide an indication of the measured physiological parameters, for instance, the concentrations of certain blood analytes being measured.

Figure 2A:
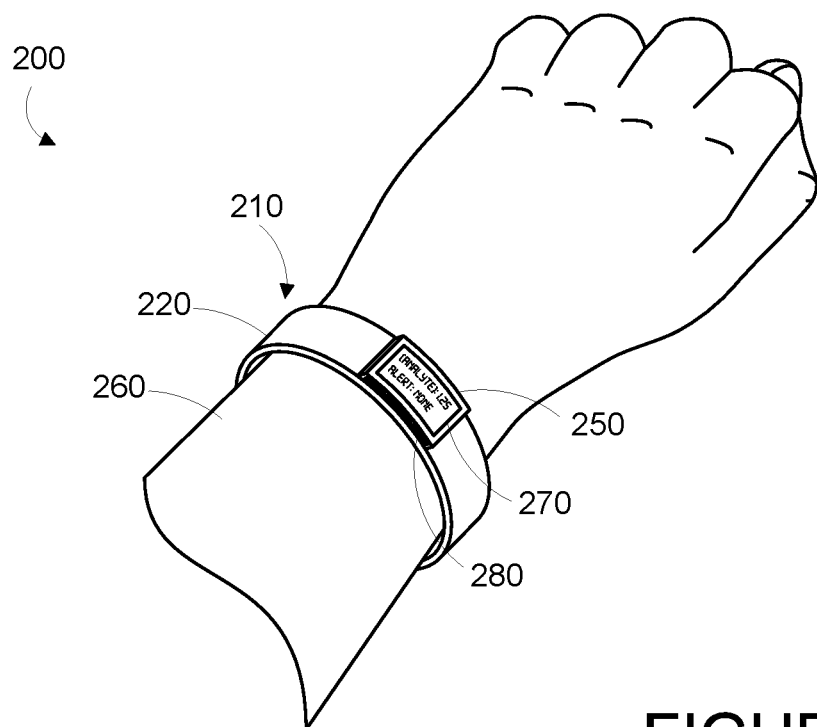
FIG. 2A is a perspective top view of an example wrist-mounted device, when mounted on a wearer's wrist.
Figure 2B:
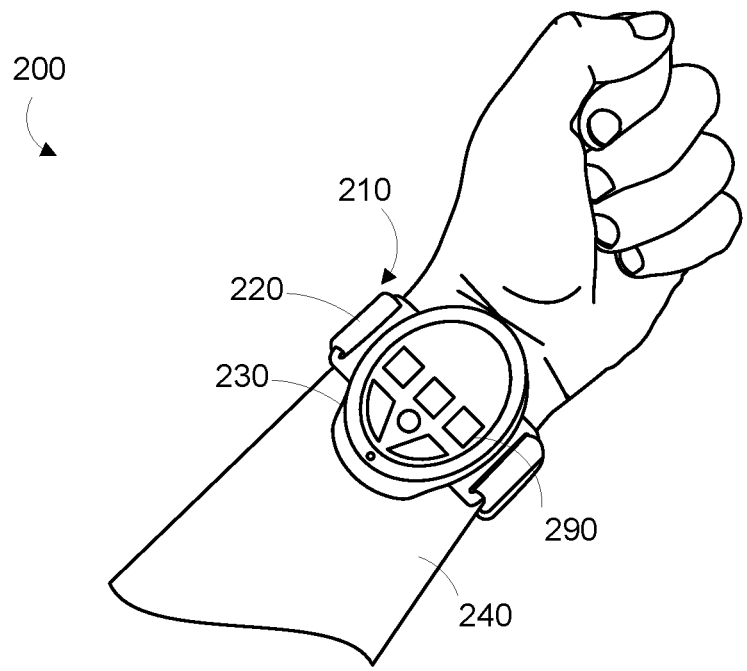
FIG. 2B is a perspective bottom view of an example wrist-mounted device shown in FIG. 2A, when mounted on a wearer's wrist.

In one example, the wearable device is provided as a wrist-mounted device, as shown in FIGS. 2A, 2B, 3A-3C, 4A, 5B, and 6. The wrist-mounted device may be mounted to the wrist of a living subject with a wristband or cuff, similar to a watch or bracelet. As shown in FIGS. 2A and 2B, the wrist mounted device 200 may include a mount 210 in the form of a wristband 220, a measurement platform 230 positioned on the anterior side 240 of the wearer's wrist, and a user interface 250 positioned on the posterior side 260 of the wearer's wrist. The wearer of the device may receive, via the user interface 250, one or more recommendations or alerts generated either from a remote server or other remote computing device, or alerts from the measurement platform. Such a configuration may be perceived as natural for the wearer of the device in that it is common for the posterior side 260 of the wrist to be observed, such as the act of checking a wrist-watch. Accordingly, the wearer may easily view a display 270 on the user interface. Further, the measurement platform 230 may be located on the anterior side 240 of the wearer's wrist where the subsurface vasculature may be readily observable. However, other configurations are contemplated.

The display 270 may be configured to display a visual indication of the alert or recommendation and/or an indication of the measured physiological parameters, for instance, the concentrations of certain blood analytes being measured. Further, the user interface 250 may include one or more buttons 280 for accepting inputs from the wearer. For example, the buttons 280 may be configured to change the text or other information visible on the display 270. As shown in FIG. 2B, measurement platform 230 may also include one or more buttons 290 for accepting inputs from the wearer. The buttons 290 may be configured to accept inputs for controlling aspects of the data collection system, such as initiating a measurement period, or inputs indicating the wearer's current health state (i.e., normal, migraine, shortness of breath, heart attack, fever, "flu-like" symptoms, food poisoning, etc.).

Figure 3A:
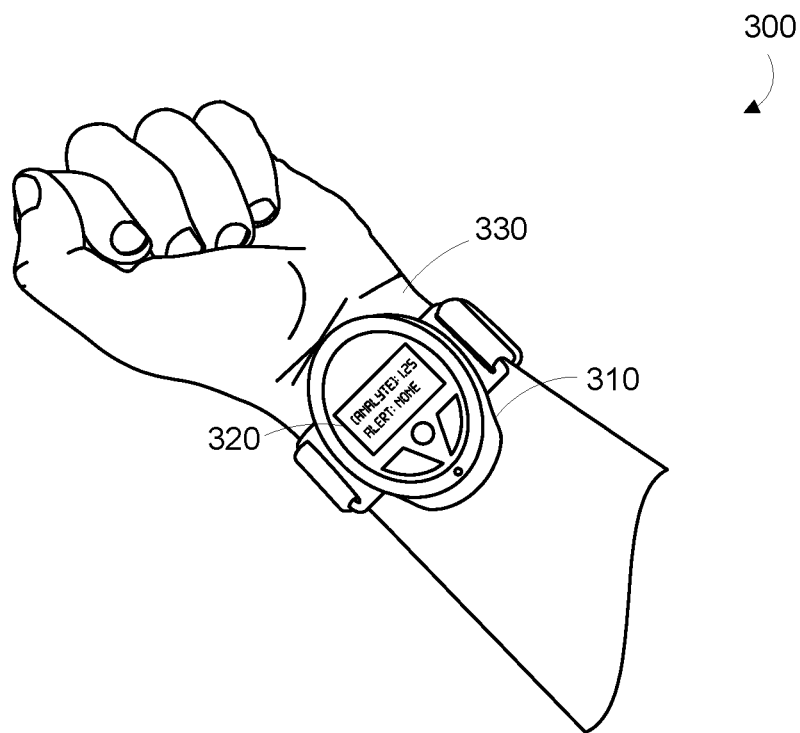
FIG. 3A is a perspective bottom view of an example wrist-mounted device, when mounted on a wearer's wrist.
Figure 3B:
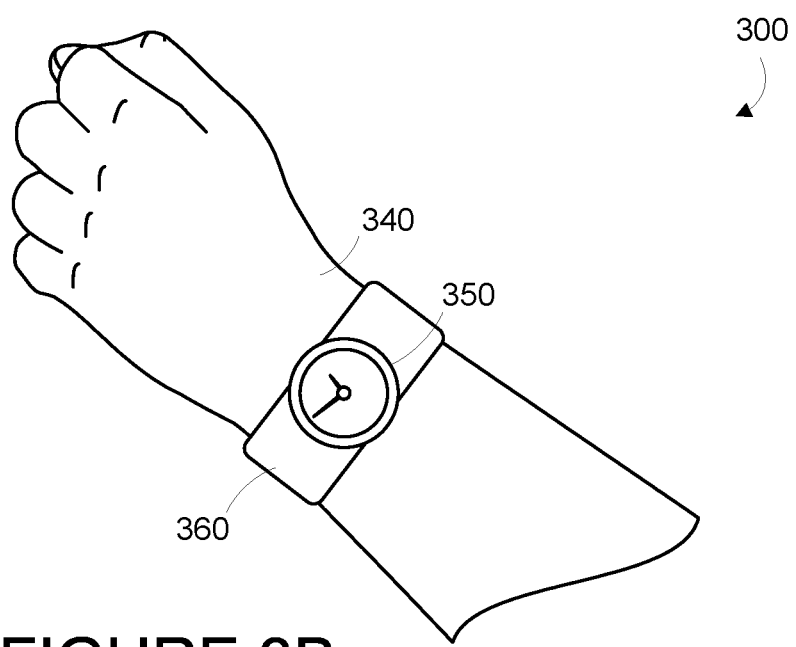
FIG. 3B is a perspective top view of an example wrist-mounted device shown in FIG. 3A, when mounted on a wearer's wrist.
Figure 3C:
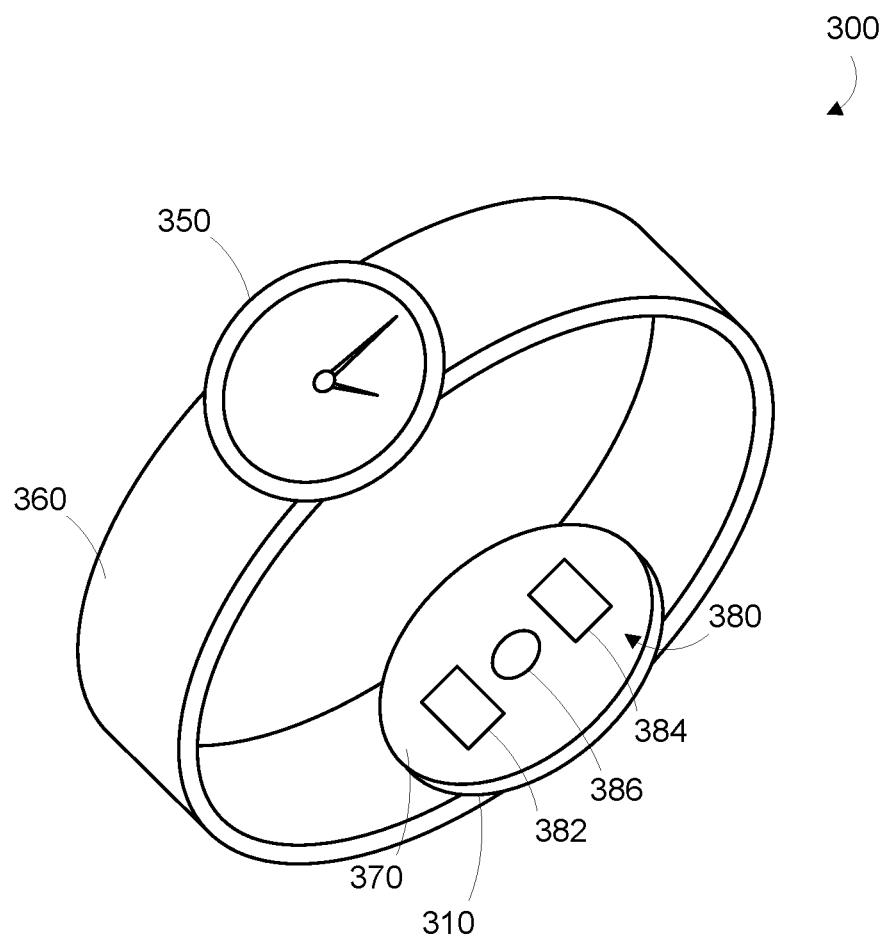
FIG. 3C is a perspective view of an example wrist-mounted device shown in FIGS. 3A and 3B.

In another example wrist-mounted device 300, shown in FIGS. 3A-3C, the measurement platform 310 and user interface 320 are both provided on the same side of the wearer's wrist, in particular, the anterior side 330 of the wrist. On the posterior side 340, a watch face 350 may be disposed on the strap 360. While an analog watch is depicted in FIG. 3B, one of ordinary skill in the art will recognize that any type of clock may be provided, such as a digital clock.

As can be seen in FIG. 3C, the inner face 370 of the measurement platform 310 is intended to be worn proximate to the wearer's body. A data collection system 380 housed on the measurement platform 310 may include a detector 382, a signal source 384 and a collection magnet 386. As described above, the signal source 384 and the collection magnet 386 may not be provided in all embodiments of the wearable device.

Figure 4A:
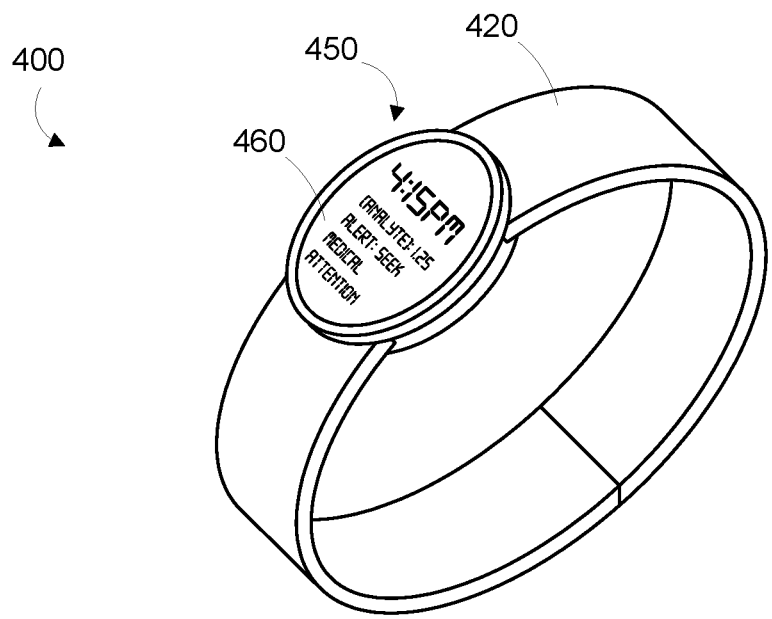
FIG. 4A is a perspective view of an example wrist-mounted device.
Figure 4B:
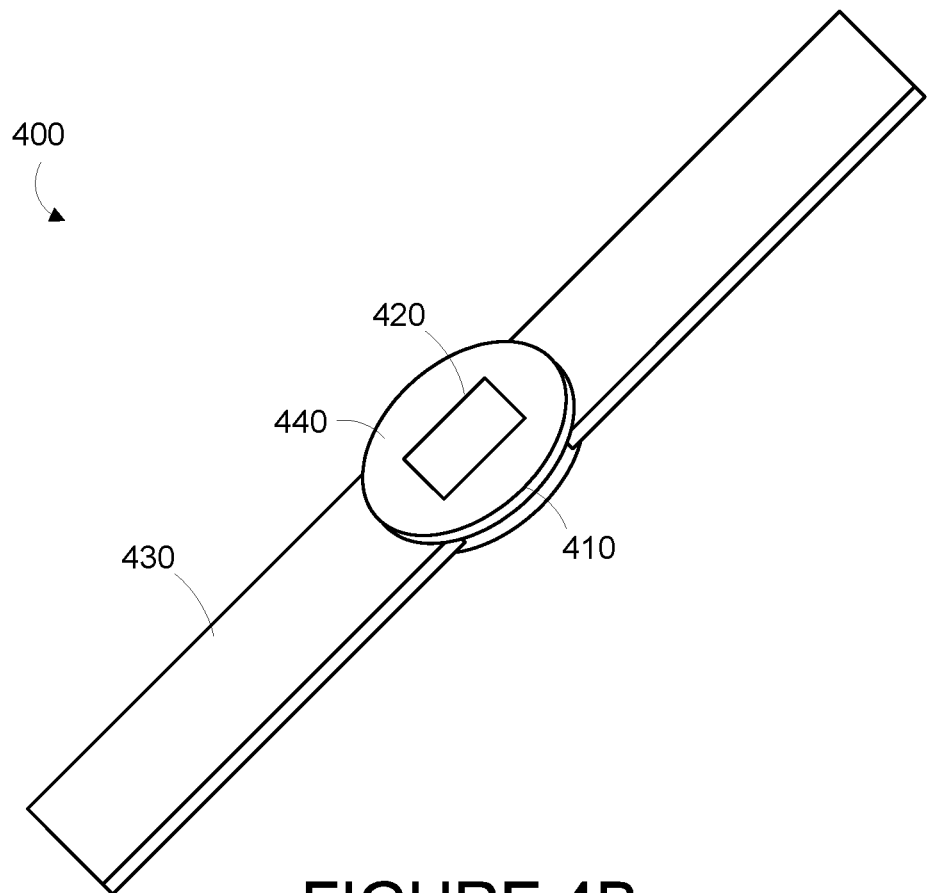
FIG. 4B is a perspective bottom view of an example wrist-mounted device shown in FIG. 4A.

In a further example shown in FIGS. 4A and 4B, a wrist mounted device 400 includes a measurement platform 410, which includes a data collection system 420, disposed on a strap 430. Inner face 440 of measurement platform may be positioned proximate to a body surface so that data collection system 420 may interrogate the subsurface vasculature of the wearer's wrist. A user interface 450 with a display 460 may be positioned facing outward from the measurement platform 410. As described above in connection with other embodiments, user interface 450 may be configured to display data collected from the data collection system 420, including the concentration of one or more measured analytes, and one or more alerts generated by a remote server or other remote computing device, or a processor located on the measurement platform. The user interface 420 may also be configured to display the time of day, date, or other information that may be relevant to the wearer.

Figure 5:
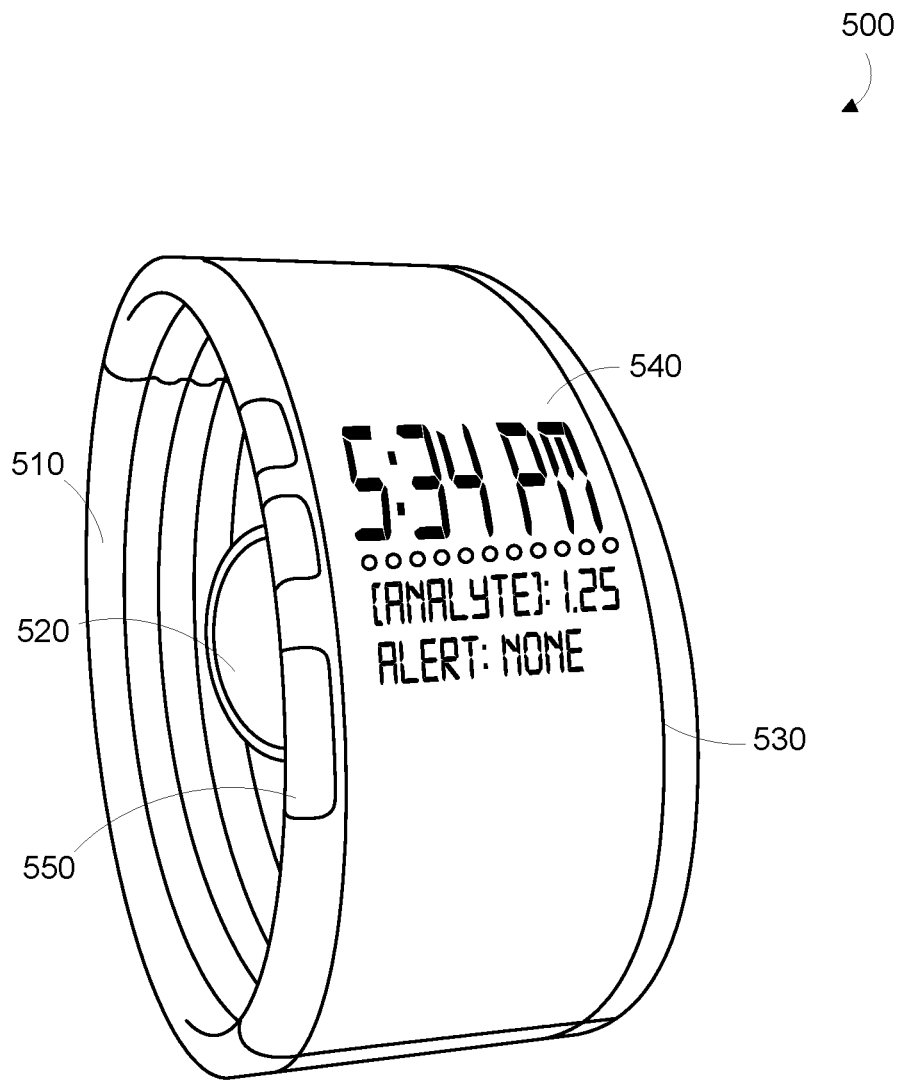
FIG. 5 is a perspective view of an example wrist-mounted device.
Figure 6:
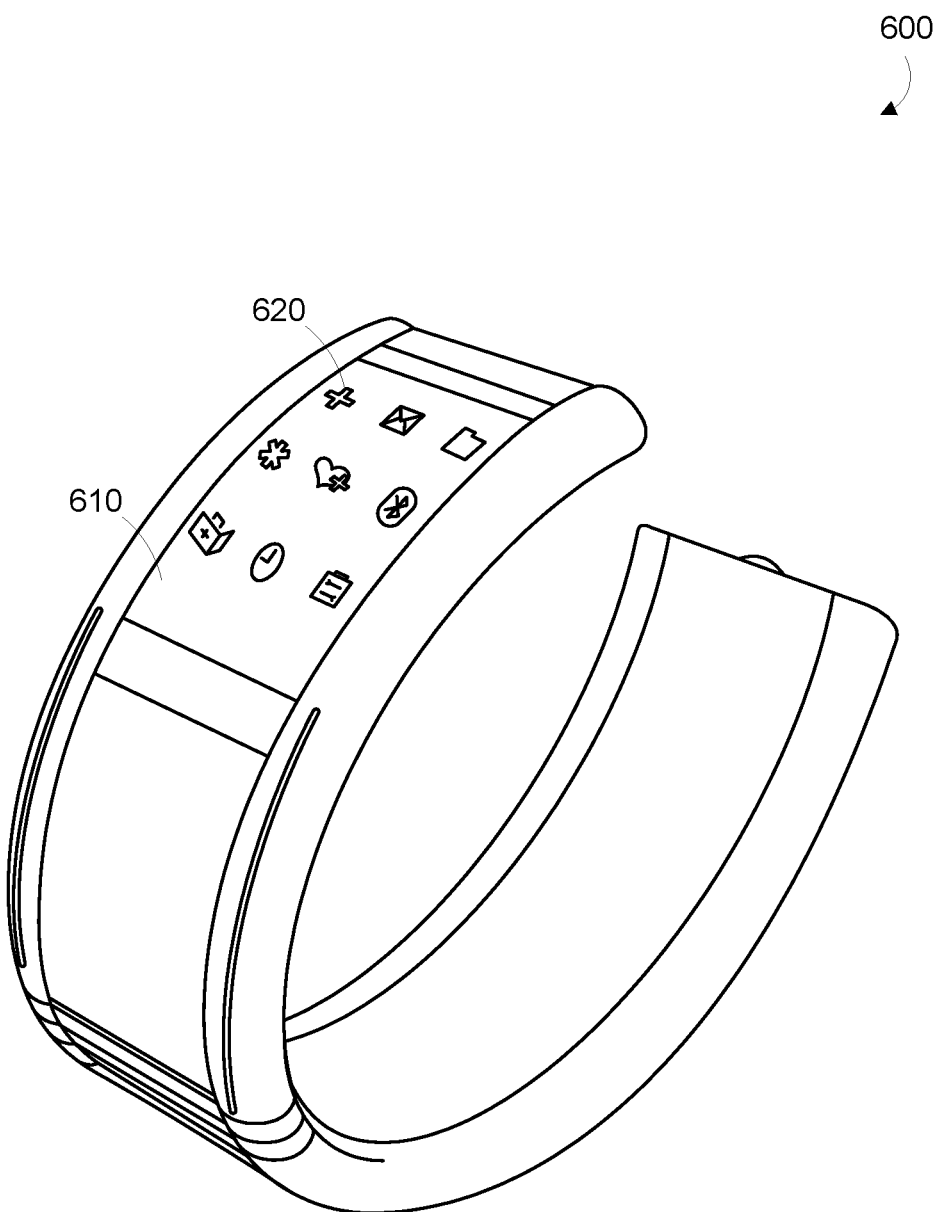
FIG. 6 is a perspective view of an example wrist-mounted device.

As shown in FIG. 5, in a further embodiment, wrist-mounted device 500 may be provided on a cuff 510. Similar to the previously discussed embodiments, device 500 includes a measurement platform 520 and a user interface 530, which may include a display 540 and one or more buttons 550. The display 540 may further be a touch-screen display configured to accept one or more input by the wearer. For example, as shown in FIG. 6, display 610 may be a touch-screen configured to display one or more virtual buttons 620 for accepting one or more inputs for controlling certain functions or aspects of the wearable device 600, or inputs of information by the user, such as current health state.

Figure 7A:
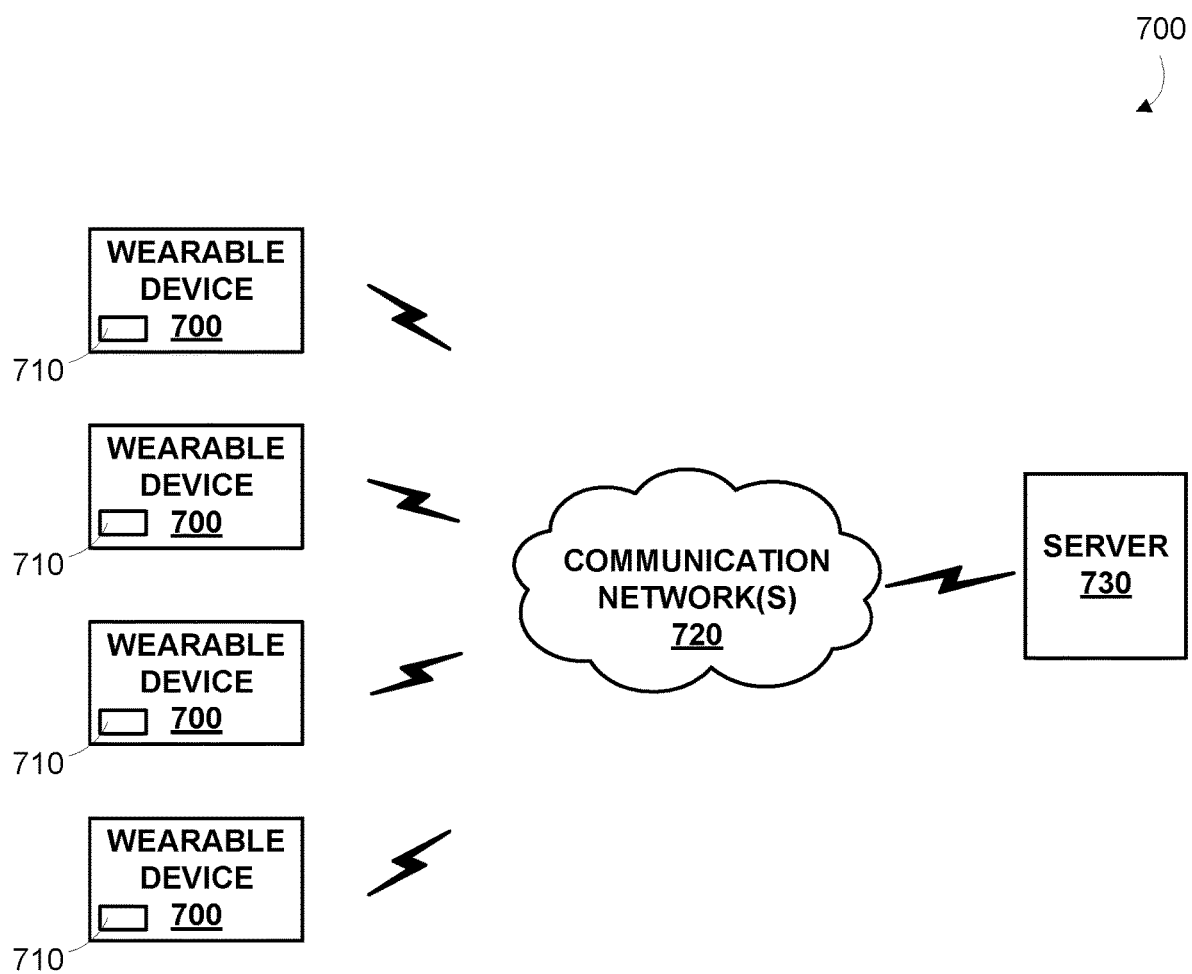
FIG. 7A is a block diagram of an example system that includes a plurality of wrist mounted devices in communication with a server.

FIG. 7A is a simplified schematic of a system including one or more wearable devices 700. The one or more wearable devices 700 may be configured to transmit data via a communication interface 710 over one or more communication networks 720 to a remote server 730. In one embodiment, the communication interface 710 includes a wireless transceiver for sending and receiving communications to and from the server 730. In further embodiments, the communication interface 710 may include any means for the transfer of data, including both wired and wireless communications. For example, the communication interface may include a universal serial bus (USB) interface or a secure digital (SD) card interface. Communication networks 720 may be any one of may be one of: a plain old telephone service (POTS) network, a cellular network, a fiber network and a data network. The server 730 may include any type of remote computing device or remote cloud computing network. Further, communication network 720 may include one or more intermediaries, including, for example wherein the wearable device 700 transmits data to a mobile phone or other personal computing device, which in turn transmits the data to the server 730.

In addition to receiving communications from the wearable device 700, such as collected physiological parameter data and data regarding health state as input by the user, the server may also be configured to gather and/or receive either from the wearable device 700 or from some other source, information regarding a wearer's overall medical history, environmental factors and geographical data. For example, a user account may be established on the server for every wearer that contains the wearer's medical history. Moreover, in some examples, the server 730 may be configured to regularly receive information from sources of environmental data, such as viral illness or food poisoning outbreak data from the Centers for Disease Control (CDC) and weather, pollution and allergen data from the National Weather Service. Further, the server may be configured to receive data regarding a wearer's health state from a hospital or physician. Such information may be used in the server's decision-making process, such as recognizing correlations and in generating clinical protocols.

Additionally, the server may be configured to gather and/or receive the date, time of day and geographical location of each wearer of the device during each measurement period. Such information may be used to detect and monitor spatial and temporal spreading of diseases. As such, the wearable device may be configured to determine and/or provide an indication of its own location. For example, a wearable device may include a GPS system so that it can include GPS location information (e.g., GPS coordinates) in a communication to the server. As another example, a wearable device may use a technique that involves triangulation (e.g., between base stations in a cellular network) to determine its location. Other location-determination techniques are also possible.

The server may also be configured to make determinations regarding the efficacy of a drug or other treatment based on information regarding the drugs or other treatments received by a wearer of the device and, at least in part, the physiological parameter data and the indicated health state of the user. From this information, the server may be configured to derive an indication of the effectiveness of the drug or treatment. For example, if a drug is intended to treat nausea and the wearer of the device does not indicate that he or she is experiencing nausea after beginning a course of treatment with the drug, the server may be configured to derive an indication that the drug is effective for that wearer. In another example, a wearable device may be configured to measure blood glucose. If a wearer is prescribed a drug intended to treat diabetes, but the server receives data from the wearable device indicating that the wearer's blood glucose has been increasing over a certain number of measurement periods, the server may be configured to derive an indication that the drug is not effective for its intended purpose for this wearer.

Further, some embodiments of the system may include privacy controls which may be automatically implemented or controlled by the wearer of the device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

Figure 7B:
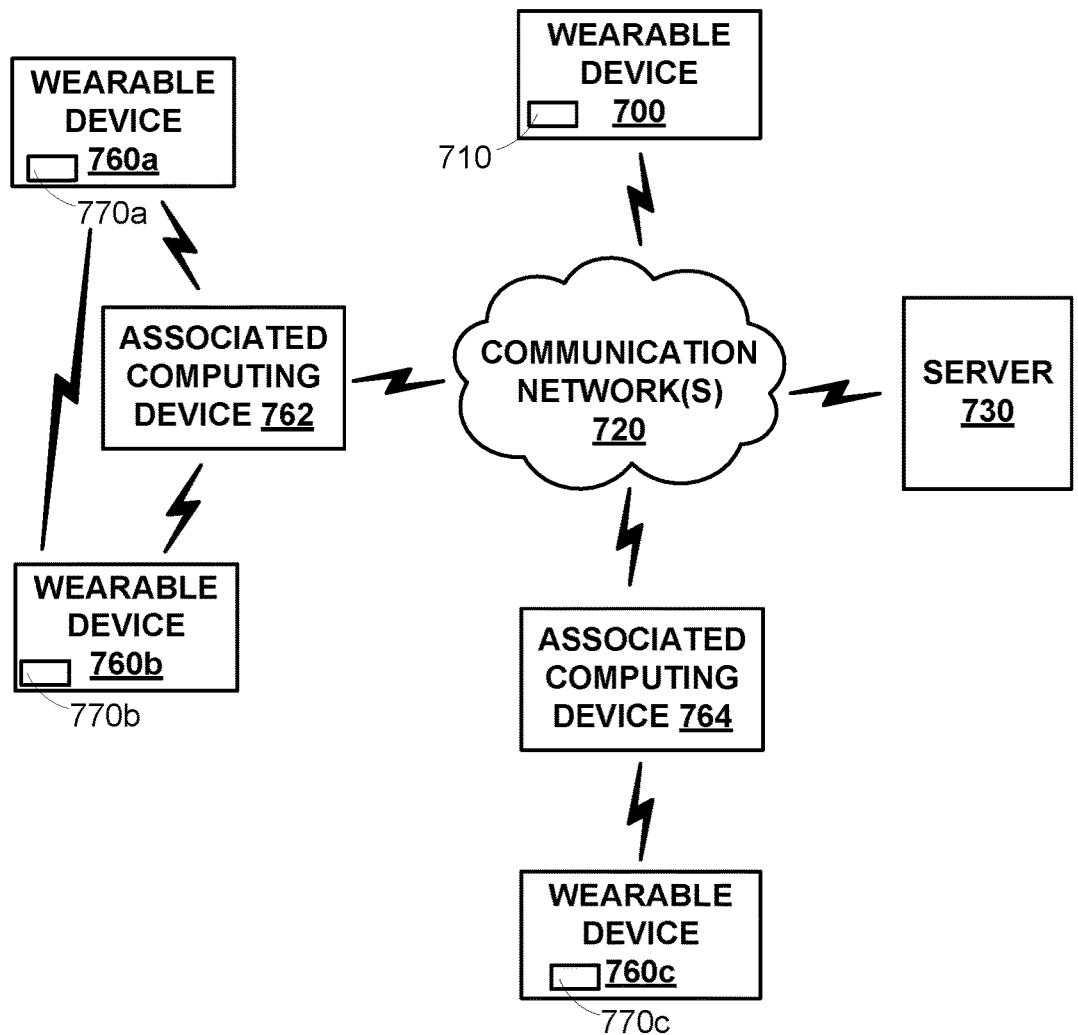
FIG. 7B is a block diagram of an example system that includes a plurality of wrist mounted devices and associated computing devices in communication with a server.

FIG. 7B is a simplified schematic of system 750 including one or more wearable devices 700*a*, 760*a*, 760*b*, 760*c*, and associated computing devices 760, 762. As in FIG. 7A, wearable device 700*a* may be configured to transmit data via a communication interface 710*a* over one or more communication networks 720 to remote server 730. FIG. 7B shows wearable devices 760*a*, 760*b* may be configured to communicate data via respective communication interfaces 770*a*, 770*b* to associated computing device 762, and that wearable devices 760*a*, 760*b* may be configured to communicate directly to each other.

FIG. 7B also shows that wearable device 760*c* may be configured to communicate data via communication interfaces 770*c* to associated computing device 764. Each of associated computing devices 762, 764 may be configured to communicate data over one or more communication networks 720 to remote server 730. Associated computing devices 762, 764 can be computing devices, such as, but not limited to, smart phones, laptop computers, desktop computers, and tablet computers. As such, some or all of communication interfaces 770*a*, 770*b*. 770*c* may be configured for low-powered, short-range communications; for example, communications using a Bluetooth® protocol and/or a ZigBee® protocol.

Figure 8:
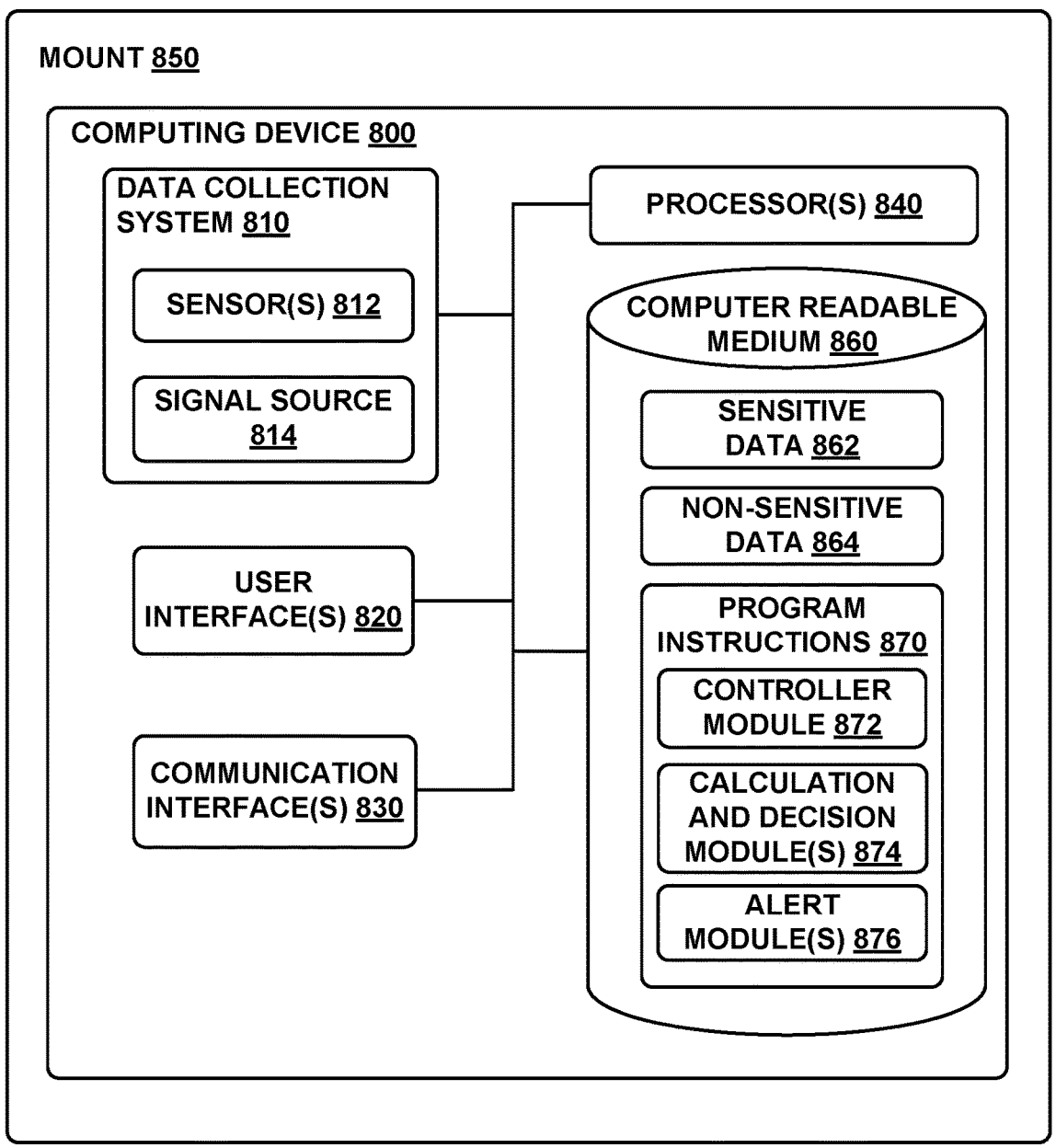
FIG. 8 is a functional block diagram of an example wearable device.

FIG. 8 is a simplified block diagram illustrating the components of a computing device 800, according to an example embodiment. Computing device 800 may be configured to carry out some or all of the herein-described functionality of wrist-mounted devices 200, 300, 400, 500, 600, shown in FIGS. 2A, 2B, 3A-3C, 4A-4C, 5 and 6, wearable devices 700, 760*a*, 760*b*, 760*c* shown in FIGS. 7A, 7B, and 10-14, server 730 shown in FIGS. 7A, 7B, 10, 13, and 14, and/or associated computing devices 762, 764 shown in FIGS. 7B, 10, 11, and 12. However, computing device 800 may also take other forms, such as, but not limited to, an ankle-mountable device, a waist-mountable device, a chest-mountable device, a head-mountable device, or an immobile computing device.

In particular, FIG. 8 shows an example of a computing device 800 having a data collection system 810, a user interface 820, communication platform 830 for transmitting data to a server, and processor(s) 840. The components of the computing device 800 may be disposed on a mount 850 for mounting the device to an external body surface or other surface.

Processor(s) 840 may be one or more general-purpose processors and/or special purpose processors (e.g., digital signal processors, application specific integrated circuits, graphics processing units, etc.). Processor(s) 840 can be configured to execute computer-readable program instructions 870 that are stored in the computer readable medium 860 and are executable to provide the functionality described herein, including but not limited to, the functionality of a wearable device, associated computing device, and/or server described herein. The computer readable medium 860 may further contain other data or information usable provide the functionality described herein, including but not limited to, the functionality of a wearable device, associated computing device, and/or server described herein. For example, as shown in FIG. 8, computer readable medium 860 can store sensitive data 862, such as physiological and/or other biological data obtained by computing device 800, and non-sensitive data 864, which can include data other than sensitive data 862.

In some embodiments, sensitive data 862 can be physically separated from non-sensitive data 864; e.g., sensitive data 862 can be stored in physical component(s) of computer readable medium that differ(s) from physical component(s) of computer readable medium 860 storing non-sensitive data 864. In other embodiments, sensitive data 862 can be logically separated from non-sensitive data 864. For example, both sensitive data 862 and non-sensitive data 864 can be stored in a database or other data storage structure. But sensitive data 862 can be accessed differently than non-sensitive data 864; e.g., based on information in a database query, access right(s) granted to sensitive data 862, and/or other information.

Some data can be sensitive data in some contexts and non-sensitive data in otherwise; e.g., location data for computing device 800 can be non-sensitive when provided to an entity CLE co-located or nearly col-located with computing device 800, such as an associated computing device discussed at least in the context of FIG. 7B, and can be sensitive otherwise. In some contexts, the data can be considered to be non-sensitive to entity CLE, as CLE could provide its location as an estimate of location data from computing device 800. However, in other contexts, such as computing device 800 not authorizing transmission of location (or other) data, then the location (or other) data can be considered to be sensitive. Many other examples of determining sensitive and/or non-sensitive data are possible as well.

The computer readable medium 860 may include or take the form of one or more non-transitory, computer-readable storage media that can be read or accessed by at least one processor 840. The one or more computer-readable storage media can include volatile and/or non-volatile storage components, such as optical, magnetic, organic or other memory or disc storage, which can be integrated in whole or in part with at least one of the one or more processors 840. In some embodiments, the computer readable medium 860 can be implemented using a single physical device (e.g., one optical, magnetic, organic or other memory or disc storage unit), while in other embodiments, the computer readable medium 860 can be implemented using two or more physical devices.

Data collection system 810 includes sensor(s) 812 and, in some embodiments, a signal source 814. Signal source 814 may generate an interrogation signal, timing signal, and/or other signal that will produce a responsive signal that can be detected by one or more of sensor(s) 812.

Sensor(s) 812 may include any sensor and/or detector capable of detecting at least one physiological parameter, which could include any parameters that may relate to the health of the person wearing the wearable device. For example, sensor(s) 812 could include one or more detectors and/or sensors configured to measure physiological data, such as blood pressure, pulse rate, skin temperature, etc. At least one of the detectors 812 is configured to non-invasively measure one or more analytes in blood circulating in subsurface vasculature proximate to the wearable device. In some examples, detector 812 may include one or more of an optical (e.g., CMOS, CCD, photodiode), acoustic (e.g., piezoelectric, piezoceramic), electrochemical (voltage, impedance), thermal, mechanical (e.g., pressure, strain), magnetic, or electromagnetic (e.g., magnetic resonance) sensor.

In some embodiments, sensor(s) 812 may include one or more sensors and/or detectors configured to measure conditions in an environment about computing device 800 and provide data about that environment. The data can include, but is not limited to: data about computing device 800, location data about computing device 800, velocity (speed, direction) data about computing device 800, acceleration data about computing device 800, and other data about the environment for computing device 800. Examples of sensor(s) 800 configured to measure conditions in an environment include, but are not limited to, power sensor(s), battery sensor(s), movement sensor(s), GPS sensor(s), location sensors(s), gyroscope(s), accelerometer(s), magnetometer(s), camera(s), light sensor(s), infrared sensor(s), and microphone(s).

The program instructions 870 stored on the computer readable medium 860 may include instructions to perform or facilitate some or all of the device functionality described herein. For instance, in the illustrated embodiment, program instructions 870 include a controller module 872, calculation and decision module 874 and an alert module 876.

The controller module 872 can include instructions for operating the data collection system 810, for example, sensor(s) 812 and signal source 814. For example, the controller 872 may activate signal source 814 and/or sensor(s) 812 during each of the pre-set measurement periods. The controller module 872 can also include instructions for operating a user interface 820. For example, controller module 872 may include instructions for displaying data collected by the data collection system 810 and analyzed by the calculation and decision module 874, or for displaying one or more alerts generated by the alert module 876. Further, controller module 872 may include instructions to execute certain functions based on inputs accepted by the user interface 820, such as inputs accepted by one or more buttons disposed on the user interface.

User interface 820 may be operable to send data to and/or receive data from external user input/output devices. For example, user interface 820 can be configured to send and/or receive data to and/or from user input devices such as a keyboard, a keypad, a touch screen, a computer mouse, a track ball, a joystick, a camera, a voice recognition module, and/or other similar devices. User interface 820 can also be configured to provide output to user display devices, such as one or more cathode ray tubes (CRT), liquid crystal displays (LCDs), light emitting diodes (LEDs), displays using digital light processing (DLP) technology, printers, light bulbs, and/or other similar devices, either now known or later developed. User interface 820 can also be configured to generate audible output(s), such as a speaker, speaker jack, audio output port, audio output device, earphones, and/or other similar devices. In some embodiments, user interface 820 can be configured to generate haptic output(s), such as vibrations and/or other outputs detectable by touch and/or physical contact with computing device 800.

Communication interface 830 may also be operated by instructions within the controller module 872, such as instructions for sending and/or receiving information via a wireless interface, which may be disposed on or in computing device 800. A wireless interface can include one or more antennas, wireless transmitters, wireless receivers, and/or wireless transceivers, such as a Bluetooth transceiver, a Zigbee transceiver, a Wi-Fi transceiver, a WiMAX transceiver, and/or other similar type of wireless transceiver configurable to communicate via a wireless network. The communication interface 830 can optionally include one or more oscillators, mixers, frequency injectors, etc. to modulate and/or demodulate information on a carrier frequency to be transmitted and/or received by the wireless interface. In some examples, the wearable device 800 is configured to indicate an output from the processor by modulating an impedance of the antenna in a manner that is perceivable by a remote server or other remote computing device.

In some embodiments, communication interface 830 can include a wired interface. The wired interface can include one or more wireline transmitters, receivers, and/or transceivers, such as a Universal Serial Bus (USB) transceiver, an Ethernet transceiver, and/or similar transceiver configurable to communicate via a twisted pair wire, a coaxial cable, a fiber-optic link, or a similar physical connection to a wired network.

Calculation and decision module 872 may include instructions for receiving data from the data collection system 810 in the form of a responsive signal and for analyzing the data. In particular, the calculation and decision module 872 may include instructions for determining, for each preset measurement time, a concentration of a clinically-relevant analyte based on the response signal detected by the detector at that measurement time and determining, for each preset measurement time, whether a medical condition is indicated based on at least the corresponding concentration of the clinically-relevant analyte. The preset measurement times may be set to any period and, in one example, are about one hour apart.

The program instructions of the calculation and decision module 872 may, in some examples, be stored in a computer-readable medium and executed by a processor located external to the wearable device; e.g., associated computing device 760, 762 and/or server 730 as shown in FIGS. 7A and 7B above. For example, the wearable device could be configured to collect certain data regarding physiological parameters from the wearer and then transmit the data to a remote server, which may include a mobile device, a personal computer, the cloud, or any other remote system, for further processing.

Example Methods of Operation

Figure 9:
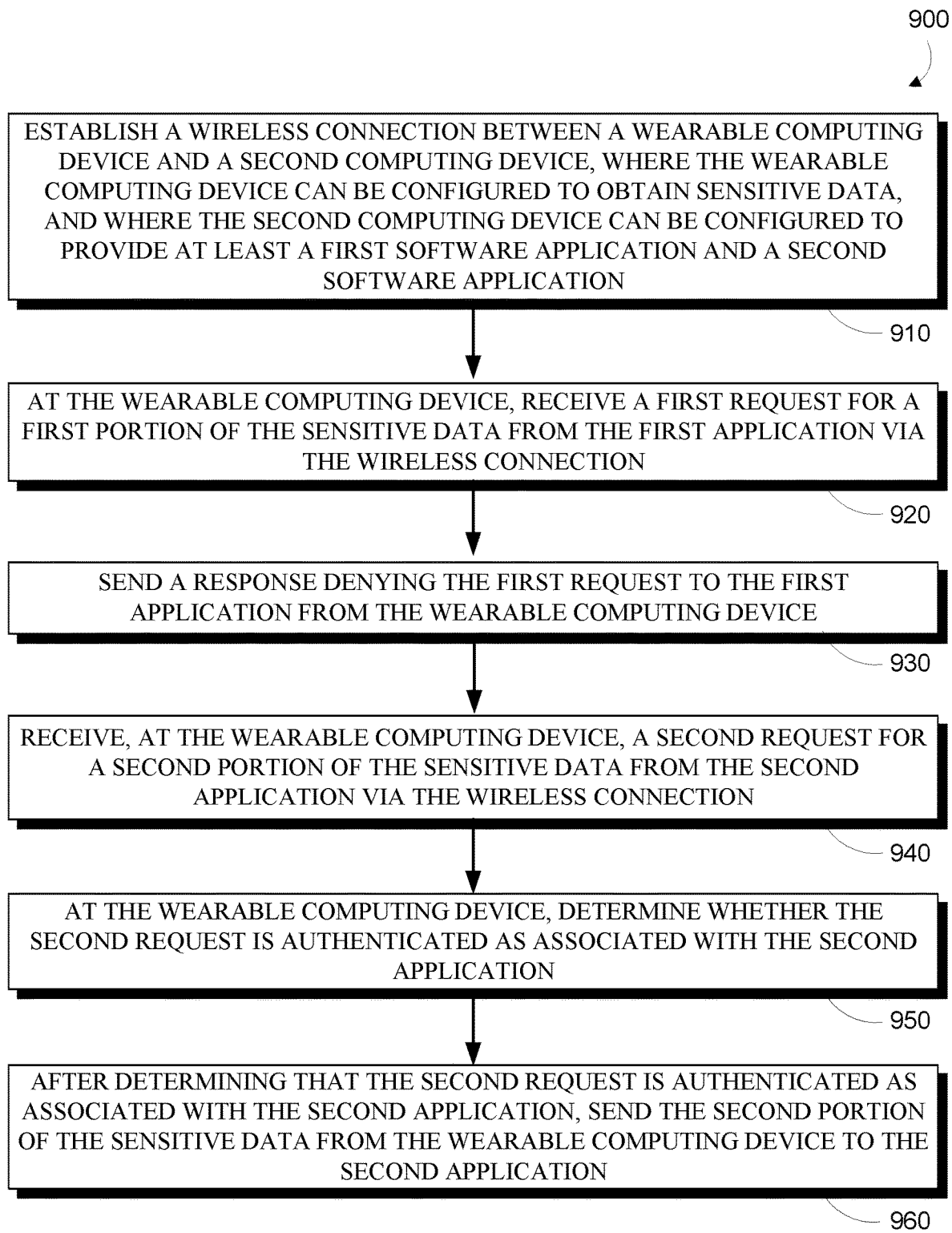
FIG. 9 is a flowchart of an example method.

FIG. 9 is a flowchart of a method 900 communicating data from a wearable computing device. Example wearable computing devices include, but are not limited to, wearable devices 100, 200, 300, 400, 500, 600, 700, 700a, 760a-760c, and 800 discussed herein with respect to FIGS. 1-8 and 10-14.

Method 900 can begin at block 910, where a wearable device can establish a wireless connection with a second computing device. Example second computing devices include, but are not limited to, wearable devices 100, 200, 300, 400, 500, 600, 700, 700a, 760a-760c, 800, server 730, and associated computing devices 762, 764. The wearable computing device can be configured to obtain sensitive data as described herein. The second computing device can be configured to provide at least a first software application and a second software application, such as discussed in the context of at least FIGS. 10-14. In some embodiments, the sensitive data can include data about physiological parameters of a wearer of the wearable computing device. In other embodiments, the second computing device can include a device selected from the group consisting of a smart phone, a laptop computer, a desktop computer, and a second wearable computing device that differs from the wearable computing device.

At block 920, the wearable computing device can receive a first request for a first portion of the sensitive data from the first application via the wireless connection, such as discussed in the context of at least FIGS. 11-14.

At block 930, the wearable computing device can send a response denying the first request to the first application, such as discussed in the context of at least FIGS. 11-14.

Figure 11:
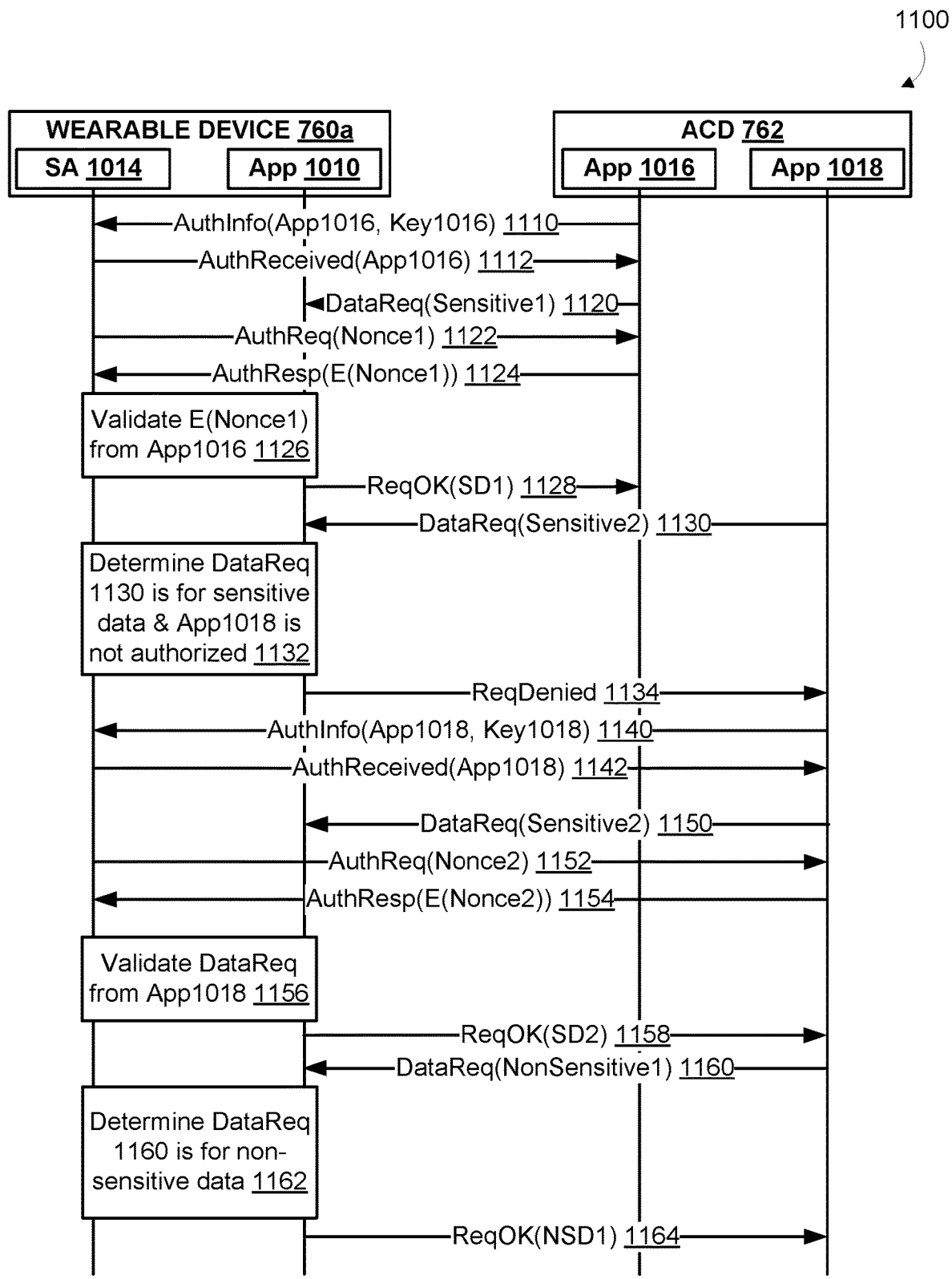
FIG. 11 depicts an example scenario with communication between a wearable device and an associated computing device.
Figure 12:
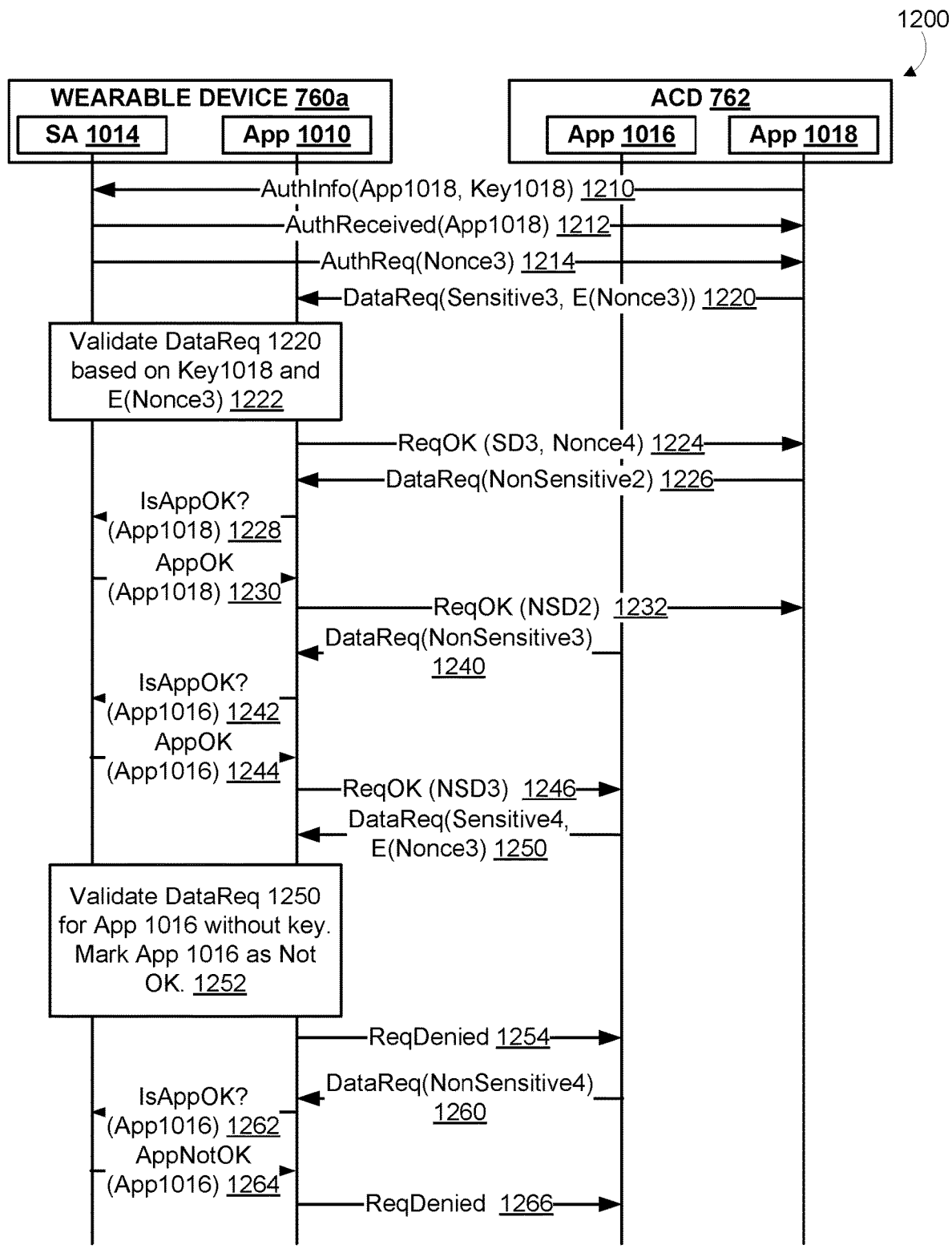
FIG. 12 depicts another example scenario with communication between a wearable device and an associated computing device.
Figure 14:
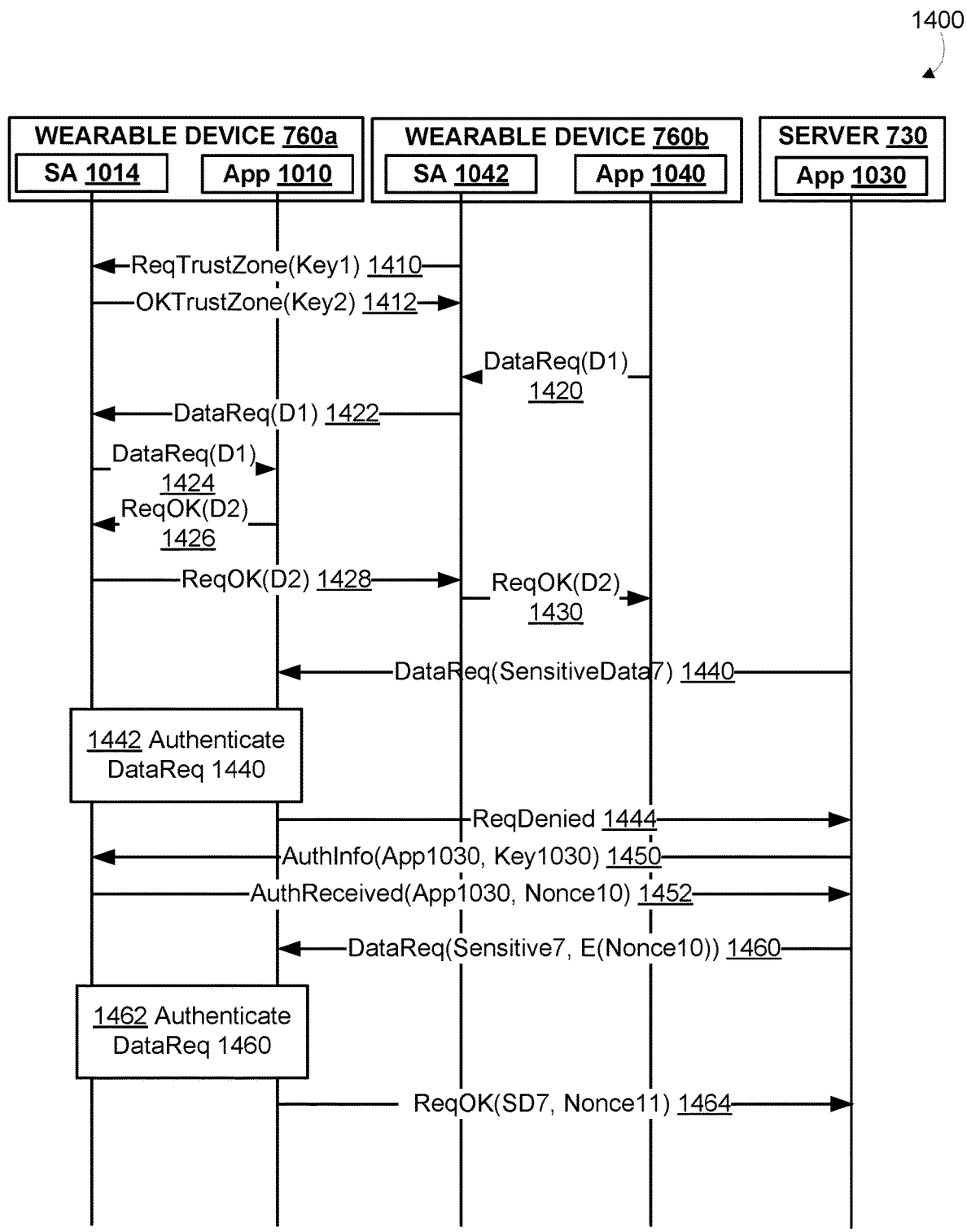
FIG. 14 depicts an example scenario with communication between two wearable devices and a server.

In some embodiments, sending the response denying the first request to the first application can include: determining whether the first application is associated with a first key; and after determining that the first application is not associated with the first key, sending the response denying the first request to the first application, such as discussed in the context of at least FIGS. 11, 12, and 14.

At block 940, the wearable computing device can receive a second request for a second portion of the sensitive data from the second application via the wireless connection, such as discussed in the context of at least FIGS. 11 and 12.

At block 950, the wearable computing device can determine whether the second request is authenticated to be associated with the second application, such as discussed in the context of at least FIGS. 11-14.

In some embodiments, determining whether the second request is authenticated to be associated with the second application can include: determining a public key associated with the second application at the wearable computing device; sending a first challenge from the wearable computing device to the second application; after sending the first challenge, receiving a digital signature from the second application at the wearable computing device; decrypting the digital signature at the wearable computing device to determine a decrypted challenge; and determining whether the first challenge is the same as the decrypted challenge, such as discussed in the context of at least FIGS. 11-14. For example, determining whether the second request is authenticated to be associated with the second application can include use of the cryptographic primitive of signing.

In particular of these embodiments, the second application can include a private key associated with the public key. Then, receiving the digital signature from the second application can include encrypting the first challenge using the private key by the second application, such as discussed in the context of at least FIGS. 11-14. For example, the first challenge can be part of a digital signature that is encrypted by the second application using the private key and that can be verified on the wearable device using the public key associated with second application.

In other particular of these embodiments, determining whether the second request is authenticated to be associated with the second application can include the wearable computing device determining whether the digital signature is associated with the second application based on the public key, such as discussed in the context of at least FIGS. 11-14. In most particular of these embodiments, the second request can include the digital signature, such as discussed in the context of at least FIGS. 11-14

At block 960, the wearable computing device can, after determining that the second request is authenticated to be associated with the second application, send the second portion of the sensitive data to the second application, such as discussed in the context of at least FIGS. 11-14.

In some embodiments, the wearable computing device can be associated with a sensor. Then, method 900 can additionally include: obtaining the data about the physiological parameters of a wearer of the wearable computing device using the sensor.

In still other embodiments, method 900 can further include: establishing a second wireless connection between the wearable computing device and a third computing device; receiving a request from the third computing device for a third portion of the sensitive data; determining, at the wearable computing device, whether the request from the third computing device is authenticated to be associated an application of the third computing device; and after determining that the request from the third computing device is not authenticated to be associated the application of the third computing device, denying the third request from the third computing device, such as discussed in the context of at least FIG. 14.

In even other embodiments, the wearable computing device can be further configured to store non-sensitive information. Then, method 900 can further include: receiving a request from the first application for a portion of the non-sensitive information; and after receiving the request from the first application for the portion of the non-sensitive information, sending the portion of the non-sensitive information to the first application, such as discussed in the context of at least FIGS. 11-13.

Example Communications Utilizing Application-Level Security

Figure 10:
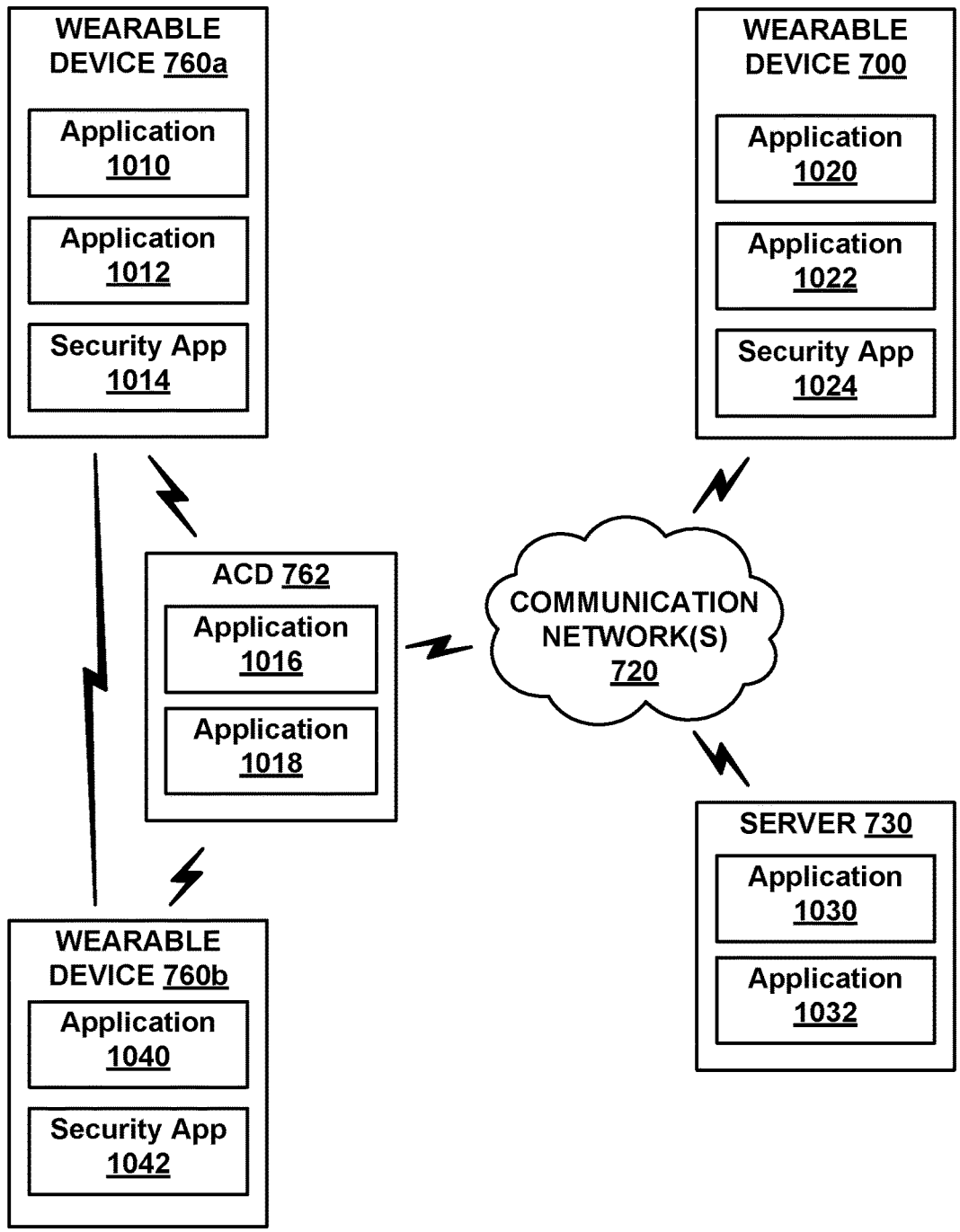
FIG. 10 is a block diagram of an example system that includes a plurality of wearable devices and an associated computing device in communication with a server.

FIG. 10 is a block diagram of example system 1000 that includes wearable devices 700, 760*a*, 760*b* and associated computing device (ACD) 762 in communication with server 730 via communication network(s) 720, as also shown in FIG. 7B. Each of wearable devices 700, 760*a*, 760*b*, associated computing device 762, and server 730 are computing devices that can be configured with machine-readable instructions to execute one or more applications. FIG. 10 shows that wearable device 760*a* can be configured to execute at least three applications: applications 1010, 1012, and security application 1014. Similarly, wearable device 760*a* can be configured to execute at least application 1040 and security application 1042, and wearable device 700 can be configured to execute at least applications 1020, 1022 and security application 1024. Associated computing device 762 is shown in FIG. 10 as being configured to execute at least applications 1016 and 1018. Further, server 730 is configured is to execute at least applications 1030 and 1032.

FIG. 11 depicts example scenario 1100 with communication between wearable device 760*a* and associated computing device 762. In scenario 1100, each application of associated computing device 762 communicating with wearable device 760*a* is provided with a key associated with sensitive data. The key can be used by a receiving application in one or more cryptographic operations. For example, the key can be used to encrypt or decrypt part or all of a message, to encrypt or decrypt a message digest/cryptographic hash function value, to encrypt or decrypt a digital signature, and/or for other operations. The receiving application may have one or more keys of its own to perform cryptographic operations as well.

In scenario 1100, wearable device 760*a* classifies data sharable with other devices into at least two types: (1) sensitive data, such as but not limited to, physiological data, and (2) non-sensitive data, which includes at least some of the sharable data not classified as sensitive data. In this scenario, sensitive data is only sent from wearable device 760*a* to authenticated applications. In other scenarios, authentication of applications can be performed before sending other types of data than sensitive data.

Scenario 1100 begins with application 1016 sending authentication information (AuthInfo) message 1110 to wearable device 760*a* to initiate authentication of application 1016 to receive sensitive data. Authentication information message 1110 can include App 1016, which is an identifier associated with application 1016, and Key 1016, which is information about a key or other secret associated with application 1016. For example, Key 1016 can be a public key associated with application 1016, a key generated by application 1016, a reference to a public key associated with application 1016, another key associated with application 1016, and/or some other information about a key or other secret associated with application 1016.

After receiving authentication information message 1110, security application 1014 of wearable device 760*a* can store the key and application identifier associated with application 1016. Security application 1014 of wearable device 760*a* can then generate authentication received message 1112 to indicate application 1016 is now authenticated to receive sensitive data from wearable device 760*a*.

In other scenarios, wearable device 760*a*, perhaps using security application 1014, and application 1016 can use a key exchange, such as the Diffie-Hellman key exchange, to exchange keys, such as Key 1016, and a key (not shown in FIG. 11) from application 1016 along with or instead of messages 1110 and/or 1112. The key-exchange protocol can be used to generate and/or communicate a shared key which can be used by both wearable device 760*a* and application 1016 for both encryption and decryption of messages/data.

Scenario 1100 continues with application 1016 of associated computing device 762 generating data request 1120 requesting sensitive data "Sensitive1" and sending data request 1120 to application 1010 of wearable device 760*a*. Upon reception of data request 1120, application 1010 and/or security application 1014 can attempt to authenticate data request 1120. For example, security application 1014 can generate a random number or other challenge Nonce1, and then send authentication request (AuthReq) 1122 with Nonce1 to application 1016. Upon reception of authentication request 1122, application 1016 can obtain Nonce1 from authentication request 1122, encrypt Nonce1 with a key associated with Key 1016, and send encrypted nonce E(Nonce1) to wearable device 760*a* using authentication response (AuthResp) 1124.

After receiving authentication response 1124, security application 1014 can attempt to decrypt the encrypted nonce E(Nonce1) at block 1126. In scenario 1100, security application 1014 successfully decrypts E(Nonce1) using Key 1016 to obtain Nonce1 and thereby validate that E(Nonce1) was encrypted by application 1016, and so validate data request 1120. Scenario 1100 continues with application 1010 sending sensitive data SD1 in request OK message (ReqOK) 1128 in response to data request 1120.

Other techniques for validating data request 1120 and/or other messages are possible as well. For example, if data request 1120 could be encrypted using a private key associated with Key 1016, then application 1010 and/or security application 1014 can decrypt data request 1120 using Key 1016, and therefore validate data request 1120. As another example, data request 1120 could include a digital signature, such as a nonce encrypted with a key associated with Key 1016, and then application 1010 and/or security application 1014 can validate the digital signature using Key 1016; e.g., by decrypting the digital signature using Key 1016 to recover the nonce value. In some embodiments, application 1010 and/or security application 1014 can validate data request 1120 and/or other messages (e.g., data requests 1130, 1150, 1160; messages not shown in FIG. 11) in combination with other components of wearable device 760*a*.

Scenario 1100 continues with application 1018 of associated computing device 762 generating data request 1130 requesting sensitive data "Sensitive2". At this stage of scenario 1100, application 1018 has not been authenticated by wearable device 760*a* to receive sensitive data. Upon reception of data request 1130, at block 1132, application 1010 and/or security application 1014 can determine that data request 1130 is a request for sensitive data and that application 1018 is not authenticated for reception of sensitive data. Therefore, as application 1018 is not authenticated for reception of sensitive data, application 1010 can send request denied message 1134 to deny data request 1130.

In response to request denied message 1134, application 1018 can request authentication to receive sensitive data from wearable device 760*a* using authentication information message 1140. Authentication information message 1140 can include App 1018, which is an identifier associated with application 1018, and Key 1018, which is information about a key or other secret associated with application 1018, such as discussed above in the context of Key 1016. After receiving authentication information message 1140, security application 1014 of wearable device 760*a* can store the key and application identifier associated with application 1018. Security application 1014 of wearable device 760*a* can then generate authentication received message 1142 to indicate application 1018 is now authenticated to receive sensitive data from wearable device 760*a*.

Key 1018 can differ from Key 1016, so that wearable device 760*a* can realize which application is sending messages to the wearable device. For example, if application 1016 sends a message encrypted using a private key associated with Key 1016, then only Key 1016 (or another secret that includes Key 1016) can decode the message. As different applications can be recognized, wearable device 760*a* can share data on a per-application basis; e.g., application 1016 can have different permissions to access data on wearable device 760*a* than any permissions provided to application 1018 to access data on wearable device 760*a*.

Scenario 1100 continues with application 1018 of associated computing device 762 generating data request 1150 requesting sensitive data "Sensitive1". Data request 1150 is also based on Key 1018; e.g., data request 1150 can be encrypted and/or digitally signed using a private key associated with Key 1018. Application 1018 sends data request 1150 to application 1010 of wearable device 760*a*.

Upon reception of data request 1150, application 1010 and/or security application 1014 can attempt to authenticate data request 1150. For example, security application 1014 can generate a random number or other challenge Nonce2, and then send authentication request 1152 with Nonce2 to application 1018. Upon reception of authentication request 1152, application 1018 can obtain Nonce2 from authentication request 1152, encrypt Nonce2, and send encrypted nonce E(Nonce2) to wearable device 760*a* using authentication response (AuthResp) 1154.

After receiving authentication response 1154, security application 1014 can attempt to decrypt the encrypted nonce E(Nonce2) at block 1156. In scenario 1100, security application 1014 successfully decrypts E(Nonce2) using Key 1018 to obtain Nonce2 and thereby validate that E(Nonce2) was encrypted by application 1016, and so validate data request 1150. Scenario 1100 continues with application 1010 sending sensitive data SD2 in request OK message (ReqOK) 1158 in response to data request 1120. Other techniques for validating data request 1150 and/or other messages are possible as well.

After sensitive data SD2 is received at application 1018, application 1018 requests non-sensitive data "NonSensitive1" from wearable device 760*a* using data request 1160. Note that, as shown in FIG. 11, data request 1160 is not based on Key 1018 or any other key. Scenario 1100 can continue with data request 1160 being sent from associated computing device 762 to application 1010 of wearable device 760*a*.

At block 1162, upon reception of data request 1160, application 1010 can determine that data request 1150 is for non-sensitive data, and so does not have to be authenticated. Then, application 1010 can obtain non-sensitive data NSD1 to fulfill data request 1160, generate request OK message 1164 with non-sensitive data NSD1, and send request OK message 1164 to application 1018 of wearable computing device 762. Upon reception of request OK message 1164 by application 1018, scenario 1100 can end.

While FIG. 11 shows communications using per-application keys between applications executing on wearable device 760a and applications executing on associated computing device 762, communications using per-application keys can be utilized between applications executing on other devices such as, but not limited to, communications between applications executing on two (or more) wearable devices, communications between applications executing on a wearable device and applications executing on server device(s), and communications between applications executing on associated computing device(s) and applications executing on server device(s). In some embodiments, requests for non-sensitive data can utilize keys as well; e.g., all communications between applications can be secured using keys. In particular of these embodiments, keys for non-sensitive data can provide completely separate access to keys for sensitive data. In other particular of these embodiments, keys for non-sensitive data can provide overlapping access with to keys for sensitive data; e.g., any key for accessing sensitive data can be used to access non-sensitive data.

FIG. 12 depicts example scenario 1200 with communication between wearable device 760a and associated computing device 762. In scenario 1200, each application of associated computing device 762 communicating with wearable device 760a is provided with a key associated with sensitive data. The key can be used by a receiving application in one or more cryptographic operations, such as discussed above in the context of scenario 1100 and FIG. 11. In scenario 1200, the receiving application may have one or more keys of its own to perform cryptographic operations as well.

As such, each pair of applications can have at least one corresponding pair of keys—with one key from each application—to enable secured and/or validated communications between the pair of applications. For example, application A can have key PrivateKeyA of its own and PublicKeyB from another application B, and application B can have PrivateKeyB of its own and PublicKeyA from application A, where PrivateKeyA and PublicKeyA form one public/private key pair associated with application A, and PrivateKeyB and PublicKeyB form another public/private key pair associated with application B. Then, application A can form a communication C1 with a digital signature generated using PrivateKeyA, and then encrypt C1 using PublicKeyB prior to sending C1 to application B. Upon reception of C1, application B can decrypt C1 using PrivateKeyB and validate the digital signature of C1 using PublicKeyA and so determine that C1 was sent from application A. For application B to send a communication C2 to application A, application B can form communication C2 with a digital signature generated using PrivateKeyB, and then encrypt C2 using PublicKeyA prior to sending C2 to application A. Upon reception of C2, application A can decrypt C2 using PrivateKeyA and validate the digital signature of C2 using PublicKeyB and so determine that C2 was sent from application B.

In another example, application A can have two private/public pairs of keys: public/private pair PrivSignKeyA/PubSignKeyA for digital signatures, and public/private pair PrivCryptKeyA/PubCryptKeyA for encryption. Similarly, application B can have two private/public pairs of keys: public/private pair PrivSignKeyB/PubSignKeyB for digital signatures, and public/private pair PrivCryptKeyB/PubCryptKeyB for encryption.

Then, application A can form a communication C3 with a digital signature generated using PrivSignKeyA, and encrypt C3 using PubCryptKeyB prior to sending C3 to application B. Upon reception of C3, application B can decrypt C3 using PrivCryptKeyB and validate the digital signature of C1 using Pub SignKeyA and so authenticate that C3 was sent from application A. For application B to send a communication C4 to application A, application B can form communication C4 with a digital signature generated using PrivSignKeyB, and then encrypt C4 using PubCryptKeyA prior to sending C4 to application A. Upon reception of C2, application A can decrypt C4 using PrivCryptKeyA and validate the digital signature of C2 using PubSignKeyB and so authenticate that C4 was sent from application B. In some embodiments where only authentication of a source application is required, the encryption of communications such as C1, C2, C3, and C4 can be omitted. Other techniques, including multiple-encryption techniques, are possible as well.

In scenario 1200, wearable device 760a classifies data sharable with other devices into at least two types: (1) sensitive data, such as but not limited to, physiological data, and (2) non-sensitive data, which includes at least some of the sharable data not classified as sensitive data.

Scenario 1200 begins with application 1018 sending authentication information message 1210 to wearable device 760a to initiate authentication of application 1018 to receive sensitive data. Authentication information message 1210 can include App 1018, which is an identifier associated with application 1018, and Key 1018, which is information about a key or other secret associated with application 1018. For example, Key 1018 can be a public key associated with application 1018, a key generated by application 1018, a reference to a public key associated with application 1018, another key associated with application 1018, and/or some other information about a key or other secret associated with application 1018.

After receiving authentication information message 1210, security application 1014 of wearable device 760a can store the key and application identifier associated with application 1018. Security application 1014 of wearable device 760a can then generate authentication received message 1212 to indicate application 1018 is now authenticated to receive sensitive data from wearable device 760a.

In other scenarios, wearable device 760a, perhaps using security application 1014, and application 1018 can use a key exchange, such as the Diffie-Hellman key exchange, to exchange keys, such as App 1018 Key and Key 1018. The key-exchange protocol can be used to generate a shared key which can be used by both wearable device 760a and application 1018 for both encryption and decryption of messages/data.

After authenticating application 1018, security application 1014 can generate and provide challenge Nonce3 to application 1018 using authentication request 1214. In scenario 1200, application 1018 can encrypt challenge Nonce3 using its key associated with Key 1018 and include the encrypted challenge with a message to act as a digital signature authenticating the message came from application 1018.

Scenario 1200 continues with application 1018 of associated computing device 762 generating data request 1220 requesting sensitive data "Sensitive3" and including digital signature E(Nonce3), where Nonce3 has been encrypted with a key associated with Key 1018. For example, if Key 1018 is a public key P1 or a reference to public key P1, then a key P2 associated with Key 1018 used to encrypt Nonce3 can be a private key, where P1 and P2 make a public/private key pair. In some cases, Key 1018 can be used only for making digital signatures; i.e., another key or keys would be used perform other cryptographic primitives, such as encryption. Then, application 1018 can send data request 1220 with digital signature E(Nonce3) to application 1010 of wearable device 760*a*.

At block 1222, upon reception of data request 1220, application 1010 and/or security application 1014 can attempt to authenticate data request 1220 based on digital signature E(Nonce3) and Key 1018. For example, application 1010 and/or security application 1014 can decrypt digital signature E(Nonce3) to recover Nonce3. Then, by comparing the decrypted digital signature with the value of Nonce3 sent as part of authentication request 1214 and determining the two nonces are equal, application 1010 and/or security application 1014 can authenticate data request 1210 as coming from application 1018.

Other cryptographic primitives can be used as well. For example, if data request 1220 is encrypted using a key associated with Key 1018, then application 1010 and/or security application 1014 can decrypt data request 1220 using Key 1018. As another example, if data request 1220 is double encrypted using Key 1018 and a key associated with application 1010 (e.g., one of application 1010's public keys), then application 1010 and/or security application 1014 can decrypt data request 1220 using a key associated with Key 1018 and another key associated with application 1010 (e.g., a private key associated with application 1010 that corresponds to the public key used to encrypt data request 1220). Other techniques for validating data request 1220 are possible as well.

In scenario 1200, data request 1220 is authenticated by application 1010 and/or security application 1014 at block 1222. Then, application 1010 can obtain sensitive data SD3 to fulfill the request for "Sensitive3" sensitive data made by data request 1220. After SD3 is obtained, application 1010 can generate request OK message (ReqOK) 1224 that includes sensitive data SD3 and a new nonce Nonce4. Then, application 1010 can send request OK message 1224 with SD3 and Nonce4 to application 1018. In some embodiments, request OK message 1224 can be encrypted or otherwise secured by wearable device 760*a*. In other embodiments, request OK message 1224 can be digitally signed by application 1010, such as discussed above in the context of data request 1220.

Then, upon reception of request OK message 1224, application 1018 can decrypt the message and/or authenticate a digital signature associated with the message, and then obtain sensitive data SD3 from request OK message 1224. Application 1018 can also save Nonce4 for generating a digital signature to authenticate a subsequent data request to wearable device 760*a*. In other embodiments, request OK message 1224 can omit Nonce4—in those embodiments, application 1018 can send a message to obtain a suitable challenge from wearable device 760*a* for a digital signature; e.g., a request nonce message.

After request OK message 1224 is received by application 1018, scenario 1200 continues with application 1018 of associated computing device 762 generating data request 1226 requesting non-sensitive data "NonSensitive2". In scenario 1200, data request 1226 is not secured, authenticated, digitally signed, validated, or otherwise based on a key, such as Key 1018. In other scenarios, data request messages for non-sensitive data can be secured and/or validated; e.g., all data requests can be encrypted and/or digitally signed regardless of the sensitive/non-sensitive type of data.

Application 1018 sends data request 1226 to application 1010 of wearable device 760*a*. Upon reception of data request 1226, application 1010 can determine data request 1226 is for non-sensitive data, and so does not have to be secured and/or otherwise based on a key. However, application 1010 can verify that application 1018 has been a good actor or is otherwise acceptable for non-sensitive data by sending Is Application OK? message (IsAppOK?) 1228 to security application 1014 to inquire about application 1018.

In response, security application 1014 can send application OK (AppOK) message 1230 indicating that application 1018 is an acceptable application for non-sensitive data. Then, after receiving application OK message 1230, application 1010 can obtain non-sensitive data NSD2 to fulfill data request 1226, generate request OK message 1232 with non-sensitive data NSD2, and send request OK message 1232 to application 1018 of associated computing device 762. In other scenarios, responses to data request messages requesting non-sensitive data; e.g., data request message 1226, can be secured and/or validated; e.g., all responses to data requests can be encrypted and/or digitally signed regardless of the sensitive/non-sensitive type of data.

Scenario 1200 can continue with application 1016 of associated computing device 762 generating data request 1240 requesting non-sensitive data "NonSensitive3". In scenario 1200, data request 1240 is not secured, validated, or otherwise based on a key, such as Key 1018. Application 1016 sends data request 1240 to application 1010 of wearable device 760*a*.

Upon reception of data request 1240, application 1010 can determine data request 1240 is for non-sensitive data, and so does not have to be secured and/or otherwise based on a key. However, application 1010 can verify that application 1016 has been a good actor or is otherwise acceptable to receive non-sensitive data by sending Is Application OK? message 1242 to security application 1014 to inquire about application 1016. In response, security application 1014 can send application OK message 1244 indicating that application 1016 is an acceptable application for non-sensitive data. Then, after receiving application OK message 1244, application 1010 can obtain non-sensitive data NSD3 to fulfill data request 1240, generate request OK message 1246 with non-sensitive data NSD3, and send request OK message 1246 to application 1016 of associated computing device 762.

Scenario 1200 continues with application 1016 of associated computing device 762 obtaining a copy of digital signature E(Nonce3) and subsequently generating data request 1250 requesting sensitive data "Sensitive4" with digital signature E(Nonce3). Then, application 1018 can send data request 1250 to application 1010 of wearable device 760*a*.

At block 1252, upon reception of data request 1250, application 1010 and/or security application 1014 can attempt to authenticate data request 1250 based on E(Nonce3). As data request 1250 came from application 1016, which had not previously provided an associated key to wearable device 760*a*, data request 1250 can be rejected. In some scenarios, application 1010 and/or security application 1014 can decrypt digital signature E(Nonce3) using Key 1018 to determine that Nonce3 is an out-of-date challenge associated with application 1018—thus, by use of Key 1018 and Nonce3, digital signature E(Nonce3) is associated with application 1018, not application 1016 that sent data request 1250.

After application 1010 and/or security application 1014 determines that application 1016 had not previously provided an associated key and/or that digital signature E(Nonce3) of data request 1250 is not associated with application 1016, then application 1010 and/or security application 1014 can determine that data request 1250 is invalid. Further, as application 1016 did not adhere to a key-sharing/security protocol, such as carried out by application 1018 using messages 1210-1214 of scenario 1200 and/or because application 1016 used a digital signature associated with a different application, application 1010 and/or security application 1014 can determine that application 1016 is not a "good actor" and perhaps be put on a "forbidden application" list. Other techniques for determining data requests are invalid are possible as well.

As data request 1250 was invalid, application 1010 can generate and send request denied message 1254 from wearable device 760a to application 1016 of associated computing device 762.

Scenario 1200 can continue with application 1016 of associated computing device 762 generating data request 1260 requesting non-sensitive data "NonSensitive4". In scenario 1200, data request 1260 is not secured, validated, authenticated, digitally signed, or otherwise based on a key, such as Key 1018. Application 1016 sends data request 1260 to application 1010 of wearable device 760a.

Upon reception of data request 1240, application 1010 can determine data request 1240 is for non-sensitive data, and so does not have to be secured and/or otherwise based on a key. However, application 1010 can determine whether that application 1016 has been a good actor or is otherwise acceptable to receive non-sensitive data by sending Is Application OK? message 1262 to security application 1014 to inquire about application 1016. In response, security application 1014 can send application not OK message 1264 indicating that application 1016 is not an acceptable application for non-sensitive data based on the actions taken by application 1016 in requesting sensitive data without following the key-sharing/security protocol discussed above in the context of block 1252. Then, after receiving application not OK message 1244, application 1010 can generate and send request denied message 1266 to application 1016 of associated computing device 762.

While FIG. 12 shows communications using one or more pairs of keys between pairs of applications executing on wearable device 760a and applications executing on associated computing device 762, communications using pair(s) of keys between pairs of applications can be utilized between applications executing on other devices such as, but not limited to, communications between pair(s) of applications executing on two (or more) wearable devices, communications between pair(s) of applications executing on a wearable device and applications executing on server device(s), and communications between pair(s) of applications executing on associated computing device(s) and applications executing on server device(s). In some other embodiments, more than a pair of keys can be used; e.g., groups of three keys shared among a set of three applications using a "three-lock box" strategy, and so on.

Figure 13:
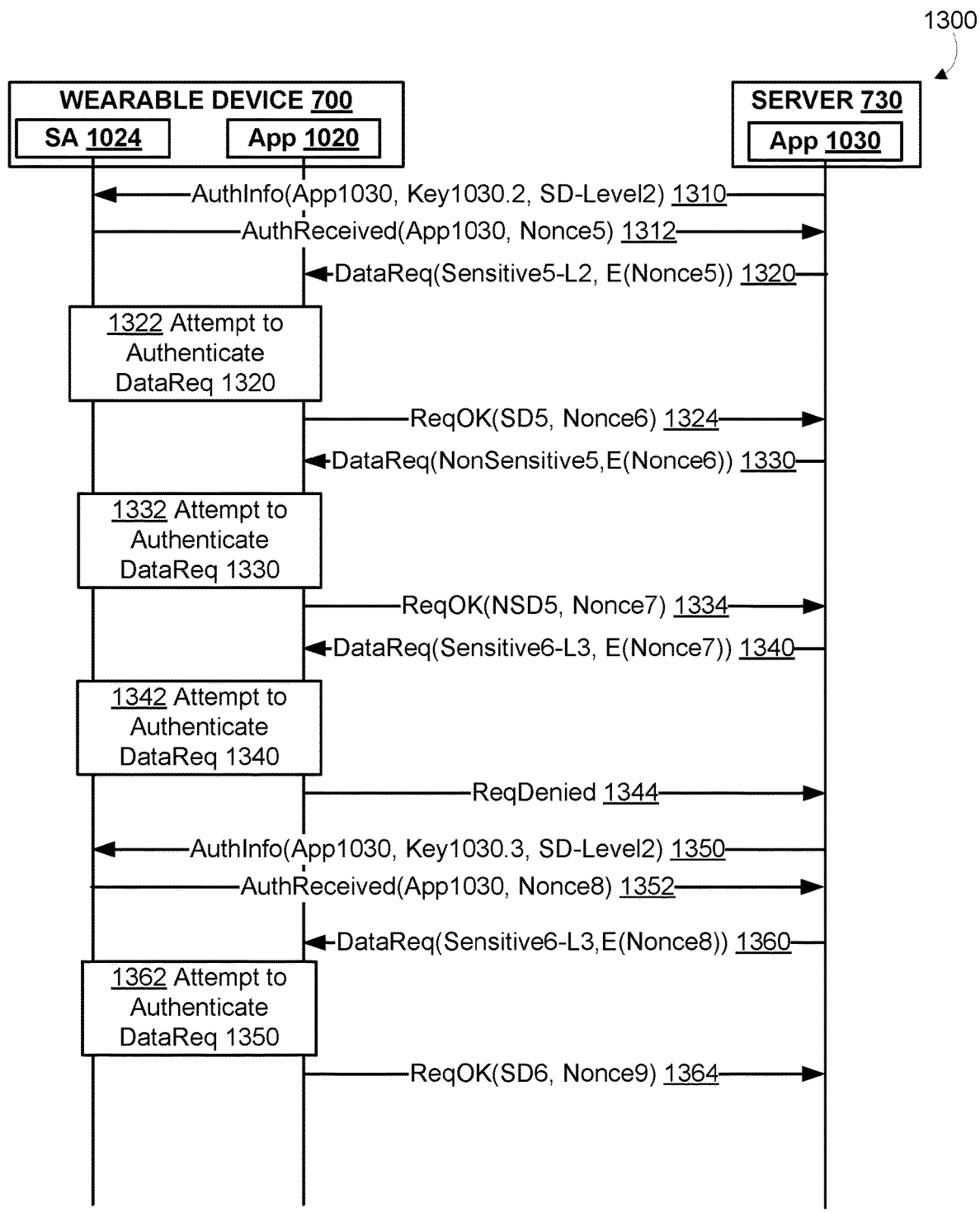
FIG. 13 depicts an example scenario with communication between a wearable device and a server.

FIG. 13 depicts example scenario 1300 with communication between a wearable device and a server. In scenario 1300, wearable device 700 classifies data sharable with other devices into at least four types: (1) level 1 sensitive data, (2) level 2 sensitive data, (3) level 3 sensitive data, and (4) non-sensitive data, which includes at least some of the sharable data not classified as sensitive data. The levels for sensitive data are hierarchical in scenario 1300; e.g., if access is granted to level 2, then access is granted to both level 1 and level 2 sensitive data, but not to level 3 sensitive data. In other scenarios, levels of data can provide other types of access than hierarchical access; e.g., the levels of data can correspond to roles or other attributes of an application and/or user associated with an application.

Scenario 1300 begins with application 1030 sending authentication information message 1310 to wearable device 700 to initiate authentication of application 1030 to receive sensitive data. Authentication information message 1310 can include App 1030, which is an identifier associated with application 1030, Key 1030.2, which is information about a key or other secret associated with application 1030, and indication "SD-Level2". Indication "SD-Level2" can indicate a request from application 1030 to utilize Key 1030.2 in communications with wearable device 700, where communications based on the key have the right to access at least level 2 sensitive data. However, Key 1030.2 is not requested to provide access to level 3 sensitive data on wearable device 700.

Key 1030.2 can be a public key associated with application 1030, a key generated by application 1030, a reference to a public key associated with application 1030, another key associated with application 1030, and/or some other information about a key or other secret associated with application 1030. In particular, Key 1030.2 can be a public key of a public/private key pair usable for public-key cryptography, whose private key is kept by application 1030 and/or server 700. In other embodiments, Key 1030.2 can be a reference to a public key; e.g., Key 1030.2 can inform wearable device 700 how to obtain the appropriate public key; e.g., from a trusted third party.

Wearable device 700 receives authentication information message 1310 and provides the message to security application 1024. Security application 1024 can determine whether key 1030.2 can be used by application 1030 to access non-sensitive data, level 1 sensitive data, and level 2 sensitive data on wearable device 700. For example, security application 1024 can examine a length of key 1030.2 or other indicia of cryptographic strength related to key 1030.2 to determine whether or not to grant application 1030 access to level 2 sensitive data. Security application 1024 can use other criteria as well to determine whether application 1030 can use key 1030.2 to access sensitive data on wearable device 700; e.g., determine whether application 1030 has been a good actor or not, determine whether application 1030 or server 730 is on a list of "forbidden applications" or "forbidden devices" that are excluded from sensitive data access (or perhaps any data access) of wearable device 700, determine whether application 1030 or server 730 is on a list of "preferred applications" or "preferred devices" that are allowed sensitive data access.

In scenario 1300, security application 1024 authorizes the use of Key 1030.2 by application 1030 for accessing level 2 sensitive data on wearable device 700. Then, security application 1024 can send authentication received message 1312 indicating that application 1030 can use key 1030.2 to access level 2 sensitive data and providing application 1030 with Nonce5 for future communications with wearable device 700.

Scenario 1300 continues with application 1030 of server 730 generating data request 1320 requesting level 2 sensitive data "Sensitive5-L2", where data request 1320 is based on Key 1030.2. In the example shown in FIG. 13, digital signature E(Nonce5) is generated by encrypting Nonce5 using a private key associated with Key 1030.2. In other examples, data request 1320 can be encrypted using Key 1030.2. Then, application 1030 can send data request 1320 to application 1020 of wearable device 700. In still other examples, data request 1320 can be encrypted using another key, such as a public encryption key associated with application 1020. In these examples, application 1020 can first decode data request 1320 using one key, such an encryption key private to application 1020, and then authenticate digital signature E(Nonce5) using Key 1030.2.

At block 1322, upon reception of data request 1320, application 1020 and/or security application 1024 can attempt to authenticate data request 1320 as coming from application 1030 based on Key 1030.2; e.g., confirming a decryption of digital signature E(Nonce5) using Key 1030.2 leads to the same Nonce5 value sent in authentication received message 1312. As another example, data request 1320 can be encrypted using a private key associated with Key 1030.2, then application 1020 and/or security application 1024 can decrypt data request 1320 using Key 1030.2. Other techniques for authenticating data request 1320 as coming from application 1030 are possible as well.

In scenario 1300, data request 1320 is authenticated by application 1020 and/or security application 1024 at block 1322. Then, application 1020 can obtain sensitive data SD5 to fulfill the request for "Sensitive5-L2" sensitive data made by data request 1320, where SD5 can include non-sensitive data, level 1 sensitive data, and/or level 2 sensitive data. After SD5 is obtained, application 1020 can generate request OK message 1324 that includes sensitive data SD5 and challenge Nonce6, and send request OK message 1324 to application 1030. Then, application 730 can obtain sensitive data SD5 upon reception of request OK message 1324. In some embodiments, request OK message 1324 can be encrypted and/or otherwise secured. In other embodiments, Nonce6 can be omitted from request OK message 1324. In these embodiments, a challenge, such as Nonce6, can be provided on specific request from application 1030 such as by sending a specific request for a challenge, such as a send challenge message, from application 1030 to wearable device 700.

Scenario 1300 continues with application 1030 of server 730 can generate data request 1330 requesting non-sensitive data "NonSensitive5", where data request 1330 is based on Key 1030.2; e.g., digital signature E(Nonce6) of data request 1330 can be generated using a key associated with Key 1030.2, data request 1330 can be encrypted using a key associated with Key 1030.2. Then, application 1030 can send data request 1330 to application 1020 of wearable device 700.

At block 1332, upon reception of data request 1330, application 1020 and/or security application 1024 can attempt to authenticate data request 1330 as coming from application 1030 based on Key 1030.2 using the techniques discussed above in the context of block 1322. In scenario 1300, data request 1330 is validated by application 1020 and/or security application 1024 at block 1332. Then, application 1020 can obtain non-sensitive data NSD5 to fulfill the request for "NonSensitive5" non-sensitive data made by data request 1330, where NSD5 can include the requested non-sensitive data. After NSD5 is obtained, application 1020 can generate request OK message 1334 that includes sensitive data NSD5 and challenge Nonce7, and send request OK message 1334 to application 1030. Then, application 730 can obtain non-sensitive data NSD5 upon reception of request OK message 1334. In some embodiments, request OK message 1334 can be encrypted and/or otherwise secured. In other embodiments, Nonce7 can be omitted from request OK message 1334, such as discussed above in the context of request OK message 1334.

Scenario 1300 continues with application 1030 of server 730 generating data request 1340 requesting level 3 sensitive data "Sensitive6-L3", where data request 1340 is based on Key 1030.2; e.g., digital signature E(Nonce7) of data request 1340 can be generated using a key associated with Key 1030.2, data request 1340 can be encrypted using a key associated with Key 1030.2. Then, application 1030 can send data request 1340 to application 1020 of wearable device 700.

At block 1342, upon reception of data request 1340, application 1020 and/or security application 1024 can attempt to authenticate data request 1340 based on Key 1030.2 using the techniques discussed above in the context of block 1322.

In scenario 1300, data request 1340 involves a request for level 3 sensitive data, but is supported by a key, Key 1030.2, that is authorize for level 2 sensitive data only. Therefore as "Sensitive6-L3" involves level 3 sensitive data, data request 1340 is not authenticated by application 1020 and/or security application 1024 at block 1342. As data request 1340 is not authenticated, application 1020 can generate and send request denied message 1344 from wearable device 700 to application 1030 of server 730.

In response to request denied message 1344, application 1030 can determine that "Sensitive6-L3" data can only be obtained using a key with level 3 sensitive data access. To request authorization of application 1030 for level 3 sensitive data access, application 1030 of server 730 can send authentication information message 1350 to wearable device 700.

Authentication information message 1350 can include Key 1030.3, which is information about a key or other secret associated with application 1018, and indication "SD-Level3". Indication "SD-Level3" can indicate a request from application 1030 to utilize Key 1030.3 in communications with wearable device 700, where communications based on the key have the right to access level 3 sensitive data. Key 1030.3 can be a public key associated with application 1030, a key generated by application 1030, a reference to a public key associated with application 1030, another key associated with application 1030, and/or some other information about a key or other secret associated with application 1030. In particular, Key 1030.3 can be a public key of a public/private key pair usable for public-key cryptography, whose private key is kept by application 1030 and/or server 700. In other embodiments, Key 1030.3 can be a reference to a public key; e.g., Key 1030.3 can inform wearable device 700 how to obtain the appropriate public key; e.g., from a trusted third party.

In scenario 1300, wearable device 700 receives authentication information message 1350 and provides the message to security application 1024. Security application 1024 can determines whether or not key 1030.3 can be used by application 1030 to access non-sensitive data, level 1 sensitive data, level 2 sensitive data, and level 3 sensitive data on wearable device 700 on wearable device 700, using the techniques regarding access to level 2 sensitive data for key 1030.2 and application 1030 discussed above in the context of authorization information message 1310.

In scenario 1300, security application 1024 authorizes the use of key 1030.3 and application 1030 for accessing level 3 sensitive data on wearable device 700. Then, security application 1024 can send authentication received message 1352 indicating that application 1030 can use key 1030.3 to access level 3 sensitive data and providing application 1030 with Nonce8 for future communications with wearable device 700.

Scenario 1300 continues with application 1030 of server 730 generating data request 1360 re-requesting level 3 sensitive data "Sensitive6-L3", where data request 1350 is based on Key 1030.3; e.g., digital signature E(Nonce8) of data request 1360 can be generated using a key associated with Key 1030.3, data request 1360 can be encrypted using a key associated with Key 1030.2. Then, application 1030 can send data request 1360 to application 1020 of wearable device 700.

At block 1362, upon reception of data request 1320, application 1020 and/or security application 1024 can attempt to authenticate data request 1360 based on Key 1030.3 using the techniques discussed above in the context of block 1322. Data request 1360 involves a request level 3 sensitive data, and is supported by a key, Key 1030.3, that is permitted to obtain level 3 sensitive data. Therefore, data request 1360 is authenticated by application 1020 and/or security application 1024 at block 1362.

Then, application 1020 can obtain sensitive data SD6 to fulfill the request for "Sensitive6-L3" sensitive data made by data request 1360, where SD6 can include non-sensitive data, level 1 sensitive data, level 2 sensitive data, and/or level 3 sensitive data. After SD6 is obtained, application 1020 can generate request OK message 1364 that includes sensitive data SD6 and send request OK message 1354 to application 1030. In some embodiments, request OK message 1364 can be encrypted and/or otherwise secured. In other embodiments, Nonce9 can be omitted from request OK message 1324, as discussed above in the context of request OK message 1324.

While FIG. 13 shows communications using multiple per-application keys to enable multiple data access levels between wearable device 700 and server 730, communications using multiple per-application keys to enable multiple data access levels between applications executing on other devices such as, but not limited to, communications between two (or more) wearable devices, communications between wearable device(s) and an associated computing device, and communications between applications executing on associated computing device(s) and applications executing on server device(s). In particular embodiments, non-sensitive data can have data access level(s) as well that can be protected by one or more keys.

FIG. 14 depicts example scenario 1400 with communication between wearable devices 760a, 760b and server 730. Scenario 1400 begins with security application 1042 of wearable device 760b sending request trust zone message 1410 to security application 1014 of wearable device 760a, where trust zone message 1410 includes a key Key1. A trust zone is established to permit device-to-device communication without per-application keys or other security; that is, all messages between devices within a trust zone are assumed to be secure after the trust zone is established. These messages can be encrypted or otherwise secured to prevent outside devices from eavesdropping on messages within the trust zone; for example, messages within a trust zone destined to wearable device 760b can be encrypted or otherwise secured using Key1.

In response to request trust zone message 1410, security application 1014 of wearable device 760a can obtain a key, Key2, for use within the requested trust zone, generate OK Trust Zone message 1412, and send OK Trust Zone message 1412 with Key2 to security application 1042 of wearable device 760b. After security application 1042 of wearable device 760b receives and processes OK Trust Zone message 1412, a trust zone can be established between wearable devices 760a and 760b, and so wearable devices 760a and 760b can consider each other trusted devices while the trust zone remains established.

Scenario 1400 can continue with application 1040 of wearable device 760b generating data request message 1420 to request data D1 from wearable device 760a. Application 1040 can send data request message 1420 to security application 1042 of wearable device 760b, which can determine that data request message 1420 is to be communicated within a trust zone. Then, security application 1042 of wearable device 760b can send the data request for D1 as data request message 1422 to security application 1014 of wearable device 760a. In some embodiments, data request message 1422 can be encrypted or otherwise secured; e.g., using Key2 provided in OK Trust Zone message 1412, while in other embodiments, data request message 1422 can be sent unencrypted or "in the clear" as being destined to a trusted device. For example, data request message 1420 can be sent unencrypted, encrypted by security application 1042 using Key2 for transmission to wearable device 760a as data request message 1422. Upon reception of data request message 1422, security application 1014 of wearable device 760a can decrypt data request message 1422, if necessary, and provide the data request for D1 as data request message 1424 to application 1010 of wearable device 760a. In some embodiments, messages within a trust zone can be communicated directly between applications without going through intermediate security applications; e.g., if application 1040 can determine that wearable device 760a is a trusted device, then application 1040 can send data request message 1420 directly to application 1010 on wearable device 760a.

Application 1010 can obtain data D2 to satisfy data request 1424, and generate data response message 1426 including data D2, and send request OK message 1426 to security application 1014 of wearable device 760a. Upon reception of request OK message 1426, security application 1014 can encrypt request OK message 1426, if needed, and send request OK message 1428 to security application 1042 of wearable device 760b. Upon reception of request OK message 1428, security application 1042 can decrypt request OK message 1428, if needed, and send request OK message 1430 to application 1040, where application 1040 can utilize received data D2.

Trust zones and application-level security, such as discussed above at least in the context of FIGS. 11-13, can be utilized at the same time. Scenario 1400 continues with application 1030 of server 730 sending data request 1440 for sensitive data "Sensitive7" to application 1010 of wearable device 760a. At block 1442, upon reception of data request 1440, application 1010 and/or security application 1014 can attempt to authenticate data request 1440. Application 1010 and/or security application 1014 can determine that data request 1440 is invalid at least because: (a) server 730 is not in the trust zone between wearable devices 760a, 760b and (b) data request 1440 was not based on a key authorized for accessing sensitive data of wearable device 760a. After determining that data request 1440 is invalid, application 1010 can send request denied message 1444 from wearable device 760a to application 1030 of server 730, as shown in FIG. 14.

In response to request denied message 1444, application 1030 can determine that "Sensitive7" sensitive data can only be obtained using a key allowing sensitive data access. Scenario 1400 continues with application 1030 of server 730 sending authentication information message 1450 to wearable device 760a. As shown in FIG. 14, authentication information message 1450 can include App 1030, which is an identifier associated with application 1030, Key 1030, which is information about a key or other secret associated with application 1030

Key 1030 can be a public key associated with application 1030, a key generated by application 1030, a reference to a public key associated with application 1030, another key associated with application 1030, and/or some other information about a key or other secret associated with application 1030. In particular, Key 1030 can be a public key of a public/private key pair usable for public-key cryptography, whose private key is kept by application 1030 and/or server 700. In other embodiments, Key 1030 can be a reference to a public key; e.g., Key 1030.2 can inform wearable device 760a how to obtain the appropriate public key; e.g., from a trusted third party.

Wearable device 760a receives authentication information message 1450 and provides the message to security application 1014. After receiving authentication information message 1450, security application 1014 can store key Key 1030 and application identifier App 1030 associated with application 1030. Security application 1014 can generate and send authentication received message 1452 to indicate application 1030 is now authenticated to receive sensitive data from application 1010 of wearable device 760a and to provide challenge Nonce10 for future communication with application 1010.

FIG. 14 shows that scenario 1100 continues with application 1030 of server 730 sending data request 1460 requesting sensitive data "Sensitive1" and signed with digital signature "E(Nonce10)", where data request 1460 is also based on Key 1030; e.g., digital signature E(Nonce10) can be encrypted using a key associated with Key 1030, data request 1460 can be encrypted using a key associated with Key 1030. At block 1462, upon reception of data request 1460, application 1010 and/or security application 1014 can attempt to authenticate data request 1460 as coming from application 1030 based on Key 1030; e.g., confirming a decryption of digital signature E(Nonce10) using Key 1030 leads to the same Nonce10 value sent in authentication received message 1452. Other techniques for authenticating data request 1460 as coming from application 1030 are possible as well.

In scenario 1400, data request 1460 is authenticated by application 1010 and/or security application 1014 at block 1462. Then, application 1010 can obtain sensitive data SD7 to fulfill the request for "SensitiveData7" sensitive data made by data request 1460. After SD7 is obtained, application 1010 can generate request OK message 1464 including sensitive data SD7 and challenge Nonce11, and send request OK message 1464 to application 1030 of server 730. In some embodiments, request OK message 1464 can be encrypted, digitally signed, otherwise secured and/or authenticated before being sent from application 1010; e.g., as discussed above in the context of at least FIGS. 11 and 12. In other scenarios, such as discussed above in the context of at least FIG. 13, levels of sensitive (and perhaps non-sensitive) data can be determined for wearable device 760a and each key granting data access to an application outside of any trust zones can provide access to the data based on an associated level of sensitive data.

While FIG. 14 shows trust zones being used between wearable devices 760a, 760b, and per-application keys used between wearable device 760a and server 730, trust zones can be established between other devices; e.g., between a wearable device and an associated computing device, between a wearable device and a server, between an associated computing device and a server. Per-application keys can be used along with trust zones as well; e.g., a trust zone can provide a base level of security between devices, while one or more per-application keys can be used to provide additional security as needed.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's physiology, medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method comprising:
    measuring, at a wearable sensor device and using a sensor of the wearable sensor device, sensor data comprising data about physiological parameters indicative of a health state of a wearer of the wearable sensor device;
    determining, at the wearable sensor device, that a first portion of the sensor data comprises sensitive data based at least in part on information indicating one or more types of data in the first portion, wherein a data repository on the wearable sensor device stores the sensitive data and non-sensitive data;
    receiving, at the wearable sensor device from a first requesting application of a computing device that is separate from the wearable sensor device, a first request for first data from the data repository;
    determining that the first data includes a type of sensitive data;
    in response to determining that the first data includes the type of sensitive data, authenticating the first request at an application level by validating a digital signature presented by the first requesting application, wherein validating the digital signature comprises:
        sending a first challenge to the first requesting application;
        after sending the first challenge, receiving the digital signature from the first requesting application;
        decrypting the digital signature to determine a decrypted challenge; and
        determining that the first challenge is the same as the decrypted challenge;
    in response to authenticating the first request at the application level, sending the first data from the wearable sensor device to the first requesting application of the computing device; and
    in response to a second request for at least some of the non-sensitive data from a second application, sending the requested non-sensitive data from the wearable sensor device to the second application without authenticating the second request at the application level.

2. The method of claim 1, wherein the received digital signature comprises an encrypted version of the first challenge that is generated by the first requesting application using a private key, and wherein decrypting the digital signature to determine the decrypted challenge comprises decrypting the encrypted version of the first challenge using a public key associated with the private key.

3. The method of claim 2, further comprising:
    before receiving the first request, receiving, at the wearable sensor device from the first requesting application, the public key associated with the private key.

4. The method of claim 1, further comprising:
    receiving, at the wearable sensor device from the first requesting application, a third request for third data from the data repository;
    determining that the third data includes a type of non-sensitive data; and
    in response to determining that the third data includes the type of non-sensitive data, sending the third data to the first requesting application of the computing device without authenticating the third request at the application level.

5. The method of claim 1, further comprising:
    receiving, at the wearable sensor device from the second application of the computing device, a third request for the first data from the data repository;
    determining that the first data includes the type of sensitive data;
    in response to determining that the first data includes the type of sensitive data, attempting to authenticate the third request at the application level;
    while attempting to authenticate the third request at the application level, determining that the wearable sensor device is unable to authenticate the third request at the application level; and
    in response to determining that the wearable sensor device is unable to authenticate the third request at the application level, sending, to the second application, a response denying the third request.

6. The method of claim 5, wherein determining that the wearable sensor device is unable to authenticate the third request at the application level comprises one or more of: (i) determining that a second application identifier of the second application is not associated with the type of sensitive data and (ii) determining that the digital signature presented by the second application is invalid.

7. The method of claim 1, wherein the first request comprises a first application identifier of the first requesting application, and wherein the second request comprises a second application identifier of the second application, and the method further comprising storing the first application identifier and the second application identifier at the wearable sensor device.

8. The method of claim 1, wherein:
    the wearable sensor device is a wrist-mounted wearable sensor device; and
    measuring the sensor data comprises measuring the sensor data with the wrist-mounted wearable sensor device mounted to a wrist of the wearer.

9. The method of claim 1, wherein the first requesting application is associated with a first cryptographic key for performing cryptographic operations comprising at least authenticating the first request at the application level.

10. The method of claim 1, wherein determining that the first data includes the type of sensitive data is based at least in part on information included in the first request.

11. A wearable sensor device comprising:
a wireless communication interface;
a sensor;
a processor; and
a non-transitory computer readable medium configured to store instructions that, when executed by the processor, cause the wearable sensor device to perform functions comprising:
measuring, using the sensor, sensor data comprising data about physiological parameters indicative of a health state of a wearer of the wearable sensor device;
determining that a first portion of the sensor data comprises sensitive data based at least in part on information indicating one or more types of data in the first portion, wherein a data repository on the wearable sensor device stores the sensitive data and non-sensitive data;
receiving, from a first requesting application of a computing device that is separate from the wearable sensor device, a first request for first data from the non-transitory computer readable medium;
determining that the first data includes a type of sensitive data;
authenticating the first request at an application level by at least:
sending a first challenge to the first requesting application;
receiving a digital signature from the first requesting application;
decrypting the digital signature to determine a decrypted challenge; and
determining that the first challenge is the same as the decrypted challenge;
sending the first data from the wearable sensor device to the first requesting application of the computing device; and
in response to a second request for at least some of the non-sensitive data from a second application, sending the requested non-sensitive data from the wearable sensor device to the second application without authenticating the second request at the application level.

12. The wearable sensor device of claim 11, wherein the received digital signature comprises an encrypted version of the first challenge that is generated by the first requesting application using a private key, and wherein decrypting the digital signature to determine the decrypted challenge comprises decrypting the encrypted version of the first challenge using a public key associated with the private key.

13. The wearable sensor device of claim 11, wherein the first request includes the digital signature.

14. The wearable sensor device of claim 11, wherein the functions further comprise:
receiving, from the first requesting application via the wireless communication interface, a third request for third data from the non-transitory computer readable medium;
determining that the third data includes a type of non-sensitive data; and
in response to determining that the third data includes the type of non-sensitive data, sending, to the first requesting application of the computing device via the wireless communication interface, the third data without authenticating the third request at the application level.

15. The wearable sensor device of claim 11, wherein the functions further comprise:
receiving, from the second application of the computing device via the wireless communication interface, a third request for the first data from the non-transitory computer readable medium;
determining that the first data includes the type of sensitive data;
in response to determining that the first data includes the type of sensitive data, attempting to authenticate the third request at the application level;
while attempting to authenticate the third request at the application level, determining that the wearable sensor device is unable to authenticate the third request at the application level; and
in response to determining that the wearable sensor device is unable to authenticate the third request at the application level, sending, to the second application via the wireless communication interface, a response denying the third request.

16. The wearable sensor device of claim 15, wherein determining that the wearable sensor device is unable to authenticate the third request at the application level comprises one or more of: (i) determining that a second application identifier of the second application is not associated with the type of sensitive data and (ii) determining that the digital signature presented by the second application is invalid.

17. A non-transitory computer readable medium configured to store at least executable instructions, wherein the executable instructions, when executed by a processor of a wearable sensor device, cause the wearable sensor device to perform functions comprising:
measuring, using a sensor of the wearable sensor device, sensor data comprising data about physiological parameters indicative of a health state of a wearer of the wearable sensor device;
determining, at the wearable sensor device, that a first portion of the sensor data comprises sensitive data based at least in part on information indicating one or more types of data in the first portion, wherein a data repository on the wearable sensor device stores the sensitive data and non-sensitive data;
receiving, from a first requesting application of a computing device that is separate from the wearable sensor device, a first request for first data from the data repository;
determining that the first data includes a type of sensitive data;
in response to determining that the first data includes the type of sensitive data, authenticating the first request at an application level by at least:
sending a first challenge to the first requesting application;
receiving a digital signature from the first requesting application;
decrypting the digital signature to determine a decrypted challenge; and
determining that the first challenge is the same as the decrypted challenge
in response to authenticating the first request at the application level, sending the first data from the wearable sensor device to the first requesting application of the computing device; and in response to a second request for at least some of the non-sensitive data from a second application, sending the requested non-sensitive data from the wearable sensor device to the second application without authenticating the second request at the application level.

* * * * *